US008483479B2

(12) United States Patent
Kunkel et al.

(10) Patent No.: US 8,483,479 B2
(45) Date of Patent: Jul. 9, 2013

(54) LIGHT DETECTION, COLOR APPEARANCE MODELS, AND MODIFYING DYNAMIC RANGE FOR IMAGE DISPLAY

(75) Inventors: Timo Kunkel, Vancouver (CA); Erik Reinhard, Long Ashton (GB); Gerwin Damberg, Vancouver (CA); Anders Ballestad, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 82 days.

(21) Appl. No.: 13/319,332

(22) PCT Filed: May 4, 2010

(86) PCT No.: PCT/US2010/033527
§ 371 (c)(1),
(2), (4) Date: Nov. 7, 2011

(87) PCT Pub. No.: WO2010/132237
PCT Pub. Date: Nov. 18, 2010

(65) Prior Publication Data
US 2012/0051635 A1    Mar. 1, 2012

Related U.S. Application Data

(60) Provisional application No. 61/177,262, filed on May 11, 2009.

(51) Int. Cl.
*G06K 9/00* (2006.01)
(52) U.S. Cl.
USPC .......................... 382/165; 382/162; 382/167
(58) Field of Classification Search
USPC ................................................ 382/162–167
See application file for complete search history.

(56) References Cited

U.S. PATENT DOCUMENTS

| | | | |
|---|---|---|---|
| 6,594,384 B1 | 7/2003 | Kim | |
| 7,035,455 B2 * | 4/2006 | Choi et al. | 382/162 |
| 7,356,180 B2 * | 4/2008 | Speigle et al. | 382/167 |
| 7,783,127 B1 * | 8/2010 | Wilensky | 382/274 |
| 7,830,566 B2 * | 11/2010 | Yamada et al. | 358/518 |
| 8,081,819 B2 * | 12/2011 | Ohga | 382/167 |

(Continued)

FOREIGN PATENT DOCUMENTS
KR    10-0311075    11/2001

OTHER PUBLICATIONS

Meylan, et al., "Tone Mapping for High Dynamic Range Displays" Proceedings of the International Society for Optical Engineering (SPIE), vol. 6492 Jan. 29, 2007.
Didyk, et al., "Enhancement of Bright Video Features for HDR Displays" Computer Graphics Forum, Amsterdam, NL, vol. 27 No. 4, Sep. 10, 2008, pp. 1265-1274.

(Continued)

*Primary Examiner* — Li Liu

(57) ABSTRACT

Embodiments relate generally to image and display processing, and more particularly, to systems, apparatuses, integrated circuits, computer-readable media, and methods that detect light sources in images to facilitate the prediction of the appearance of color for the images in different viewing environments and/or dynamic range modification based on the light sources (e.g., perceived light sources). In some embodiments, a method includes detecting pixels representing a portion of an image, specifying that a subset of pixels for the image portion is associated with a light source, and determining a parameter for the subset of pixels, the parameter being configured to generate a color in a reproduced image that includes the image portion. In one embodiment, light sources are detected to facilitate converting between high dynamic ranges and low dynamic ranges of luminance values.

17 Claims, 19 Drawing Sheets

U.S. PATENT DOCUMENTS

| | | | |
|---|---|---|---|
| 8,260,080 B1 * | 9/2012 | Wilensky | 382/274 |
| 8,290,262 B2 * | 10/2012 | Ishii | 382/167 |
| 8,300,931 B2 * | 10/2012 | Lee | 382/167 |
| 2006/0262363 A1 | 11/2006 | Henley | |
| 2008/0204479 A1 | 8/2008 | Seetzen | |
| 2009/0010532 A1 | 1/2009 | Fukazawa | |
| 2009/0034867 A1 | 2/2009 | Seetzen | |

OTHER PUBLICATIONS

Kunkel, et al., "A Neurophysiology-inspired Steady-State Color Appearance Model" Journal of the Optical Society of America A: Optics and Image Science and Vision, vol. 26, No. 4, Apr. 1, 2009, pp. 776-782.

* cited by examiner

LIGHT DETECTION, COLOR APPEARANCE MODELS, AND MODIFYING DYNAMIC RANGE FOR IMAGE DISPLAY

CROSS-REFERENCE TO RELATED APPLICATIONS

This application claims priority to U.S. Provisional Patent Application No. 61/177,262 filed 11 May 2009 hereby incorporated by reference in its entirety.

FIELD

Embodiments of the invention relate generally to image and display processing, and more particularly, to systems, apparatuses, integrated circuits, computer-readable media, and methods that detect light sources in images to facilitate the prediction of the appearance of color for the images in different viewing environments and/or dynamic range modification based on the light sources (e.g., perceived light sources).

BACKGROUND

Color appearance models ("CAMs") have been developed to match colors under different environment conditions that otherwise might be perceived to be different, according to the human visual system ("HVS"). In particular, a color captured (e.g., in an image) under one set of conditions may be perceived as a different color by an observer viewing that color in another set of conditions. The following are examples of factors that can contribute to perceptible color mismatches: the different chromacities and/or luminance levels of different illuminants, different types of devices used to display the color, the relative luminance of the background, different conditions of the surrounding environment, as well as other factors. Conventional color appearance models aim to compensate for these factors by adjusting an image viewed with a destination set of conditions so that it appears to be the same color at which it was captured with a source set of conditions. Thus, color appearance models can be used to convert a patch of color seen in one environment (e.g., the source environment) to an equivalent patch of color as it would be observed in a different environment (e.g., the target environment).

While functional, some approaches in predicting color appearance, including chromatic adaptation, have their drawbacks. In at least one approach, the determination of the effects of different chromacities and luminance levels of illuminants typically requires manual intervention, such as manually measuring environmental parameter values. Often, the environmental parameter values are then encoded as metadata that accompanies the image data for modifying the color at a target environment. Or, in some cases, estimated or presumed values of environmental parameters are used to guide the chromatic adaptation process. To illustrate, consider the CIECAM02 Color Appearance Model ("CAM") maintained by the International Commission on Illumination ("CIE") of Vienna, Austria. According to this model, a degree of adaptation, D, is dependent on an adapting luminance, $L_A$, which is typically presumed to be approximately 20% of the luminance of a white object in a viewing environment. The luminance of the white object is typically measured using optical measuring device and the values are manually implemented in predicting color appearance. Further, some color appearance model implementations also derive the degree of adaptation, D, based on a few predetermined, constant surround conditions that relate to a few predetermined values for a luminance level adaptation factor, $F_L$, an impact of surround, c, and a chromatic induction factor, $N_c$. In some approaches, some parameters are applied globally over most or all portions of an image, regardless whether a portion includes a light source, a reflective surface, or otherwise.

In view of the foregoing, it would be desirable to provide systems, computer-readable media, methods, integrated circuits, and apparatuses to facilitate the prediction of the appearance of color in images for different viewing environments, including high dynamic range images.

SUMMARY

Embodiments relate generally to image and display processing, and more particularly, to systems, apparatuses, integrated circuits, computer-readable media, and methods that detect light sources in images to facilitate the prediction of the appearance of color for the images in different viewing environments and/or dynamic range modification based on the light sources (e.g., perceived light sources). In some embodiments, a method includes detecting pixels representing a portion of an image, specifying that a subset of pixels for the image portion is associated with a light source, and determining a parameter for the subset of pixels, the parameter being configured to generate a color in a reproduced image that includes the image portion. In one embodiment, determining the parameter includes calculating a degree of adaptation, D, for the subset of pixels constituting the light source. In some embodiments, the degree of adaptation is determined for each pixel. For a light source, the degree of adaptation can specify no discounting of an illuminant. In one embodiment, light sources are detected to facilitate converting between high dynamic ranges and low dynamic ranges of luminance values.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
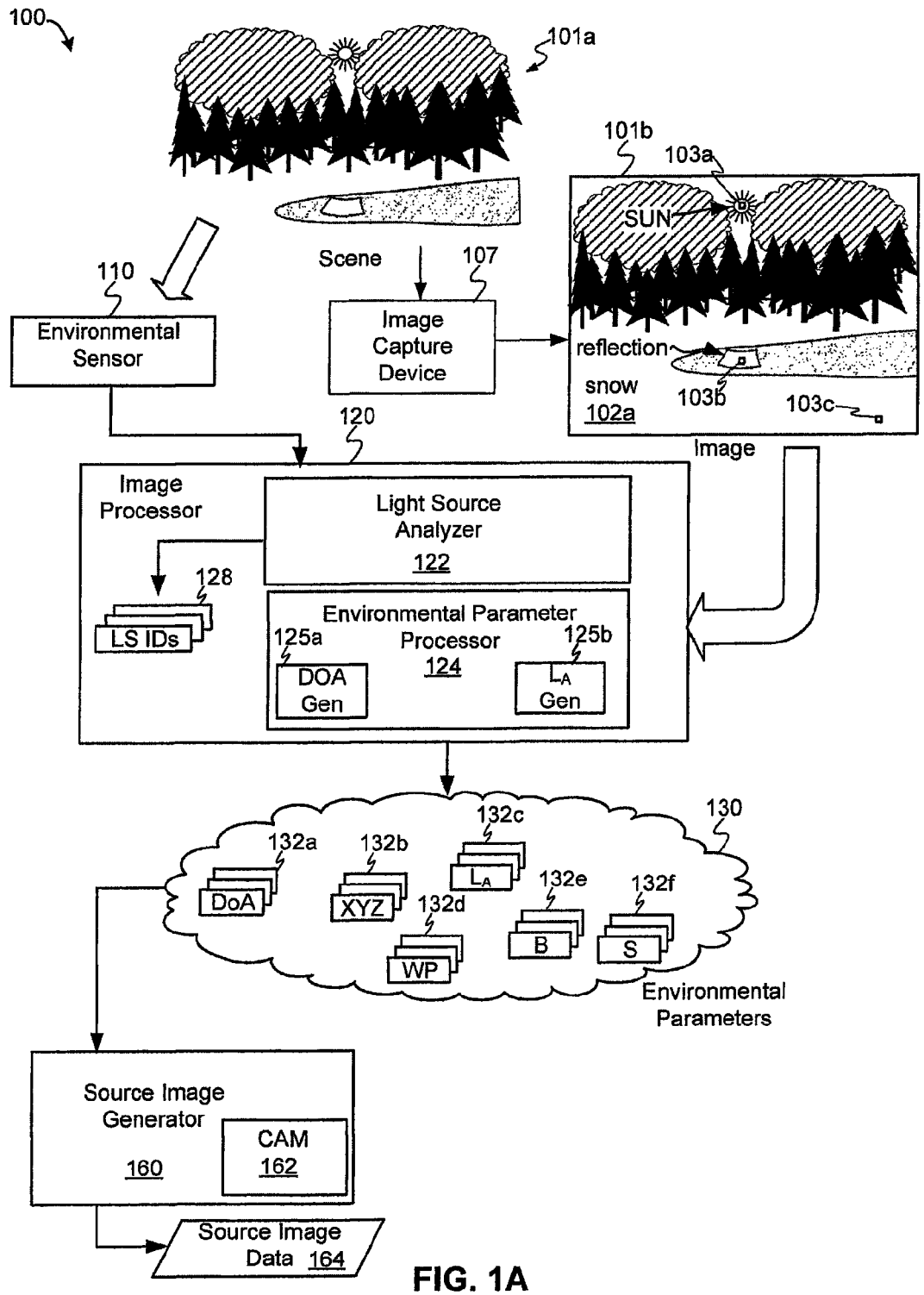
FIG. 1A is a diagram illustrating an example of a system for detecting light sources to modify color captured at a source environment, according to at least some embodiments of the invention.

FIG. 1A is a diagram illustrating an example of a system for detecting light sources to modify color captured at a source environment, according to at least some embodiments of the invention. As shown, system 100 includes an image processor 120 and a source image generator 160, and is configured to process images at a source environment. Image processor 120 is configured to generate environmental parameters 130, which are used by source image generator 160 to generate source image data 164 that are configured to reproduce the color at a target environment. Examples of source image data 164 include appearance correlates that are generated in accordance with a color appearance model ("CAM") 162, as well as information characterizing a light source or a non-light source. Image processor 120 is shown to include a light source analyzer 122 and an environmental parameter processor 124. Light source analyzer 122 is configured to detect one or more pixels that represent portions of image 101b that qualify as candidate light sources, and is configured further to identify whether the pixels are part of a light source (e.g., perceived as being self-luminous) or not (e.g., being perceived as a reflective surface, such as a diffuse reflective surface, or otherwise opaque surface). As used herein, the term "light source" refers, at least in some embodiments, to one or more pixels associated with a portion of an image that depicts an illuminant (e.g., a physical light source that generates light), such as a light bulb or the sun, or such as a surface of an object (e.g., a specular reflective surface) that can be perceived as being self-luminous, such as a mirror, ice or glass. According to some embodiments, an illuminant can refer to a perceived light source (either a physical light source or a highly reflective surface), where the illuminant can be in a scene (e.g., a source environment), captured as part of an image of the scene, or be associated with a viewing environment (e.g., a target environment). The term "light source" can describe a stimulus or pixels that are perceived by the human visual system ("HVS") as being self luminous, and, as such, can be used interchangeably with the term "perceived light source." In some instances, a light source may have luminance values higher than, for example, a range of values associated with non-light source. As used herein, the term "non-light source" refers, at least in some embodiments, to one or more pixels associated with a portion of an image that depicts a surface of an object (e.g., a diffusely reflective surface) that may scatter or diffuse light so that the surface can be perceived as being not shiny or specular, such as a fabric or soil. In some examples, a non-light source is a surface that reflects light in a diffusive manner that is not perceived as a light source by the HVS. Examples of non-light sources include a piece of white paper or a white wedding dress in a relatively dark surrounding, where the paper and dress have a relatively bright appearance. Note that the term "non-light source" also can refer, in some embodiments, to one or more pixels associated with a portion of an image that depicts a physical light source having a sufficiently large size that it may not be perceived as a light source. In some embodiments, light source analyzer 122 is configured to identify one or more pixels as a light source as a function of size and/or luminance values, relative to at least other pixels that are associated with a non-light source. Environmental parameter processor 124 is configured to determine a parameter 130 for one or more of the pixels, whereby parameter 130 can be configured to facilitate generation of a color in a reproduced image at a target environment, for example, in conjunction with target image generator 170. In some embodiments, parameter 130 is consumed by color appearance model ("CAM") 162 to generate appearance correlates, such as a lightness correlate, a chroma correlate, and a hue correlate.

In view of the foregoing, image processor 120 and at least some of its constituents can detect one or more light sources, as well as distinguish light sources from non-light sources. In particular, light source analyzer 122 can differentiate regions that are perceived as being self-luminous in an image from regions that include non-light emitting surfaces, such as diffuse reflective surfaces or lightened translucent surfaces (e.g., light behind a green house windows or frosted windows) that are not perceived as being self-luminous. Image processor 120 can be configured to determine a degree of adaptation, D, as at least one of parameters 130 based on information associated with a pixel, including whether the pixel is part of a light source. According to various embodiments, a degree of adaptation, D, can be determined for each pixel individually, or, in some cases, the degree of adaptation can be determined globally (e.g., over all or a predominant number of pixels). In some embodiments, the degree of adaptation can be determined differently for pixels associated with a perceived light source than pixels for non-light sources. Further, image processor 120 can be configured to determine an adapting luminance, $L_A$, based on pixel information for non-light sources, for example. In some embodiments, image processor 120 can be configured to determine (or approximately determine) a color (e.g., a perceived color) of an illuminant associated with a light source based on pixels determined to be a light source or non-light source. In some embodiments, pixels associated with a light source can be driven to luminance levels in a larger range than pixels associated with non-light sources. For example, consider that an image is configured to operate with a relatively low dynamic range ("LDR") of luminance values. When displayed on a display for producing images in a relatively high dynamic range ("HDR") of luminance values, image processor 120 can be configured to extend the range of luminance values (e.g., from LDR to HDR ranges of luminance values) for pixels associated with light sources, whereas the range of luminance values for non-light sources can be smaller (e.g., equivalent to the low dynamic range of luminance values of the original image).

To illustrate operation of image processor 120, consider that image processor 120 analyzes data representing an image, such as image 101b, which includes pixel data representing a sun, pixel data representing a specular reflection (e.g., a perfect, minor-like reflection) of the sun on the surface of ice, and pixel data representing snow 102a covering the ground. Snow 102a appears as a relatively light portion of the image 101b. Light source analyzer 122 is configured to analyze pixels, such as pixel 103a, of the image portion including the sun, as well as pixels, including pixel 103b, of another image portion that includes the reflection. Further, light source analyzer 122 is configured to analyze pixels, such as pixel 103c, of yet another image portion that represents the snow-covered ground. Image 101b can be generated by an image capture device 107, such as a camera, that is configured to capture the imagery of a scene 101a in which the sun provides for an illuminant in the source environment. Note that further to the example shown, while the sun may be the dominant light source, there can be other surfaces that may be perceived as being self-luminous (i.e., perceived light sources), such as a sheet of ice reflecting specularly the sun as reflection 103b. In some embodiments, environmental sensor 110 is configured to sense optically environmental parameters that influence operation of color appearance model 162. Examples of environmental sensor 110 include a digital camera (e.g., a high definition image camera capable of providing HDR images), a photometer, a photo detector, a light sensor configured to receive light for sensing levels of luminance as well as color, and other types of sensors for determining parameters 130 used for modifying color (or an appearance of color).

Environmental parameter processor 124 can include an adapting luminance, $L_A$, generator ("$L_A$ Gen") 125b that is configured to generate data representing adapting luminance ("$L_A$") parameters 132c for pixels of image 101b. An adapting luminance, $L_A$, can be the luminance of the adapting field that specifies an average intensity of light over an area (e.g., over all or a predominant number of pixels in image 101b), according to some embodiments. Note that the determination of adapting luminance, $L_A$, need not be limited to the image and can be derived by considering the environment (e.g., the source or target environment) using environment sensor 110. An adapting field can be described as including a proximal field, a background field, and a surround field. In some embodiments, the value for adapting luminance parameter 132c is selected as the luminance value of the brightest pixel in image 101b that is not part of a light source (i.e., not part of a perceived light source). For example, adapting luminance generator 125b can be configured to determine a pixel in image 101b that is not associated with a light source, such as pixel 103c, which depicts a portion of the snow-covered ground in this example and is not a perceived light source. Once adapting luminance generator 125b detects that a pixel for a non-light source has a luminance value greater than the other pixels for non-light sources (e.g., objects having diffuse reflective surfaces), adapting luminance generator 125b can select that luminance value as a value of an adapting luminance. In at least one embodiment, adapting luminance parameter 132c is a global parameter that is used by source image generator 160 for all pixels in image 101b.

In some embodiments, adapting luminance generator 125b is configured to generate multiple adapting luminance parameters 132c as a number of adapting luminance localized values. Specifically, adapting luminance generator 125b can select a luminance value for pixels constituting a non-light source as a localized adapting luminance parameter 132c, while selecting other luminance values as localized adapting luminance parameters 132c for other non-light sources. In operation, adapting luminance generator 125b identifies a group of pixels in image 101b that are associated with a non-light source, and further determines a luminance value that is greater than other luminance values for other non-light source pixels. Then, adapting luminance generator 125b can select the greatest luminance value as the adapting luminance, $L_A$, for a region of image 101b that includes the group of pixels. In this case, adapting luminance parameter 132c is a local parameter for the region or portion of image 101b. In some embodiments, a single adapting luminance parameter 132c can be used for pixels that do not form part of a light source (i.e., pixels perceived as white while not being perceived as a light source), and localized adapting luminance parameters 132c can be individually derived and used for light sources and non-light sources.

Environmental parameter processor 124 also can include a degree of adaptation generator ("DOA Gen") 125a that is configured to generate data representing degree of adaptation ("DoA") parameters 132a for pixels of image 101b. The degree of adaptation, D, can be a luminance-adjusted degree of adaptation (e.g., chromatic adaptation) that indicates whether to discount an illuminant (or to what degree to discount the illuminant), according to some embodiments. Degree of adaptation generator 125a can receive light source identifiers ("LS IDs") 128 that specifies whether a pixel is associated with a light source, the identity of the light source, as well as other light source-related information, such as luminance levels and light source size. In some embodiments, the degree of chromatic adaptation to convert from source to target environment is less or is negligible for self-luminous portions of image 101b, relative to non-light sources. Thus, degree of adaptation generator 125a can be configured to set a pixel associated with a light source to zero (e.g., D=0) so that the illuminant (e.g., its color or luminance) is not discounted (e.g., no adaptation to the adopted white point). Further, degree of adaptation generator 125a is configured to calculate a degree of adaptation, D, for pixels that constitute a non-light source, whereby the degree of adaptation discounts an illuminant (e.g., partial up to complete adaptation to the adopted white point). For example, the non-light source is a surface that provides for an amount of diffusive reflection that scatters and reflects light at a greater number of angles than a specular reflective surface. In some examples, a non-light source may reflect an amount of light that can be perceived as a bright surface, but is not perceived by the HVS as being a light source. For pixels other than those associated with a light source, degree of adaptation generator 125a can generate degree of adaptation parameters 132a that discount the illuminant in chromatic adaptation for pixels associated with, for example, non-light sources. Thus, the degree of adaptation can be non-zero value, ranging up to, and including, the value of one (e.g., D=1), which specifies complete adaptation.

In some embodiments, the degree of adaptation is determined on a pixel-by-pixel basis, whereby the value for the degree of adaptation is a function of a luminance value for a corresponding pixel. In at least one embodiment, a degree of adaptation can be interpolated by first determining a difference between a luminance value for a pixel in a light source (e.g., where D=0) and a luminance value of a pixel for which the degree of adaptation is being determined. Then, a distance from D=0 to the value of degree of adaptation (e.g., 0<D<1) can be determined, where the distance can be determined by either a linear or non-linear relationship. In another embodiment, pixels associated with light sources are associated with values of D that are set to zero (0). Further, pixels that are not associated with perceived light sources and are for instance relatively dark or associated with low luminance values can be associated with a value of D set to an intermediate degree of adaptation, Dint, which corresponds to a threshold luminance value. The threshold luminance value defines a level below which the value of D (i.e., below Dint) can be relatively constant or can be interpolated differently for luminance values above the threshold luminance value. Finally, pixels for non-light sources (or pixels with luminance values above the threshold luminance value) can have the degree of adaptation, D, interpolated in proportion to the pixels' luminance values between that of a light source and the threshold luminance value. The degree of adaptation can be interpolated linearly or non-linearly. In one example, the degree of adaptation can vary between D=0 and Dint as a function of a Hermite polynomial that provides smooth interpolation between the two values of D=0 and Dint. An example of such a polynomial is $2s^3-3s^2+1$, where s represents a scaling of high and low luminance values to correspond to a range from 0 to 1. In at least one embodiment, the intermediate degree of adaptation, Dint, is calculated by using equations 1 to 3.

In some embodiments, degree of adaptation generator 125a can generate Dint (i.e., "D"), as well as any value of D for pixels individually, at least in some cases, as follows in equation (1).

$$D = F - \left(\frac{F}{3.6}\right)\exp\left(\frac{-L_a - 42}{92}\right) \quad (1)$$

where F (i.e., "$F_L$") is determined by equations 2 and 3.

$$F_L = 0.2k^4(5L_A) + 0.1(1-k^4)^2(5L_A)^{1/3} \quad (2)$$

$$k = 1/(5L_A + 1) \quad (3)$$

The adapting luminance, $L_A$, can be determined by adapting luminance generator 125b as described above. In some embodiments, the determination of the value of $F_L$ need not be limited to equation (2) and can be determined by other means, such as any function based on $L_A$.

Image processor 120 can be configured to determine a white point for image 101b by computing an average tristimulus value for each candidate light source. The average value approximates the color of the light source, under which the gray-world assumption can be applied locally. For example, the average of tristimulus values X, Y, and Z can be used to determine a white point. In some embodiments, image processor 120 generates data representing a white point ("WP") parameter 132d for one or more light sources associated with a candidate light source (or framework). Image processor 120 can be configured to determine data representing tristimulus values X, Y, and Z based on the transformation of R, G and B pixel values. Tristimulus values X, Y, and Z are shown as parameters 132b in FIG. 1A. Image processor 120 can be configured further to determine background luminance ("B") as a parameter 132e. Background luminance can also be referred by the notation "$Y_b$," in some cases. In some embodiments, image processor 120 determines the background luminance based on the luminance values of neighboring pixels within a region about a pixel for which the background luminance is calculated. Image processor 120 also can be configured to determine a surround value ("S") as a parameter 132f. In some embodiments, environmental sensor 110 detects luminance values associated with the surround field, and image processor 120 determines the surround luminance based on the measured luminance values of the surround field. Other parameters can be determined by image processor 120, with or without environmental information sensed by environmental sensor 110.

According to some embodiments, source image generator 160 and CAM 162 are configured to perform chromatic adaptation for each pixel (i.e., including non-linear response compression) to generate transformed tristimulus values (or cone response values) L', M', and S' as set forth in equation 4a to 4c as follows.

$$L' = 400\frac{(F_L L/100)^{0.42}}{(F_L L/100)^{0.42} + \sigma_L^{0.42}} + 0.1 \quad (4a)$$

$$M' = 400\frac{(F_L M/100)^{0.42}}{(F_L M/100)^{0.42} + \sigma_M^{0.42}} + 0.1 \quad (4b)$$

$$S' = 400\frac{(F_L S/100)^{0.42}}{(F_L S/100)^{0.42} + \sigma_S^{0.42}} + 0.1 \quad (4c)$$

These response values are derived from using equations 5a to 5c, which rely on values Lw, Mw, and Sw (i.e., tristimulus values of the white point in the cone color space), and "D," which represents a degree of adaptation derived as set forth above.

$$\sigma_L = 2588(D(L_W/100) + (1-D)) \quad (5a)$$

$$\sigma_M = 2588(D(M_W/100) + (1-D)) \quad (5b)$$

$$\sigma_S = 2588(D(S_W/100) + (1-D)) \quad (5c)$$

Source image generator 160 then generates appearance correlates as source image data 164. Note that source image generator 160 and CAM 162 can be configured to implement various color appearance models with which light source detection can be used, according to the various embodiments. For example, image processor 120 can be implemented to identify light sources for purposes of generating environmental parameters 130 for the CIECAM02 color appearance model, or equivalent.

As used herein, the term "sample" can refer, in some embodiments, to an object that can provide a stimulus, including color, that can be described in a set of tristimulus values, such as the tristimulus values of X, Y, and Z of the CIE XYZ color space. The term sample can be used interchangeably with "patch," "stimulus," or "test." And, as used herein, one or more pixels or sub-pixels can constitute a sample, according to some embodiments. Further, a sample can constitute a portion of an image, such as a digital image that includes of any number of pixels. Thus, the structures and/or functions describe herein can be applied to one or more pixels as well as an image (e.g., a set of pixels constituting the image). An image can be composed of pixels that each can be represented by pixel data. The pixel data can specify whether the image is a high dynamic range ("HDR") image, for example, by a number of bits describing ranges of luminance (or radiance) levels within ranges of 4 or more orders of magnitude, or is a low dynamic range ("LDR") image. An image (e.g., a still image or a frame of a video) captured at a source environment can be presented at a target environment as a displayed image (e.g., displayed on a monitor or LCD display, a projected image), and a printed image (e.g., printed on a medium, such as paper). In various embodiments, one or more of the parameters and other data described herein can be determined at either the pixel level, the local level (e.g., a group of pixels) as, for example, a local operator or appearance correlate, or the global level (e.g., the image) as, for example, a global operator or appearance correlate.

As used herein, the term "color" can refer, in some embodiments, to a perceived color associated with a spectral distribution of the color stimulus, as well as the viewing conditions (e.g., the size, shape, structure, and surround of the area in which the color stimulus originates). Color can also depend on an observer's visual system and its ability to adapt to different illuminants, among other things. The term color, according to some embodiments, can also refer to an amount (e.g., a measured amount) of spectrally weighted photons emanating from, for example, a surface of a display device or any device configured to produce an image. As used herein, the term "candidate light source" can refer, in some embodiments, to potential light sources and non-light sources that include pixels having sufficient luminance values that indicate an image portion is perceived either self-luminous or reflective. A candidate light source can be described as a framework or a group of surfaces (e.g. groups of pixels in the image) that relate to each other, and a framework can either be perceived as self-luminous or reflective. Further, a candidate light source or framework can be characterized by the size (e.g., an area), a corresponding quantity of pixels, a number of image layers through which the framework passes, one or more luminance values (or variants thereof, including average luminance values), and equivalent characteristics.

Figure 1B:
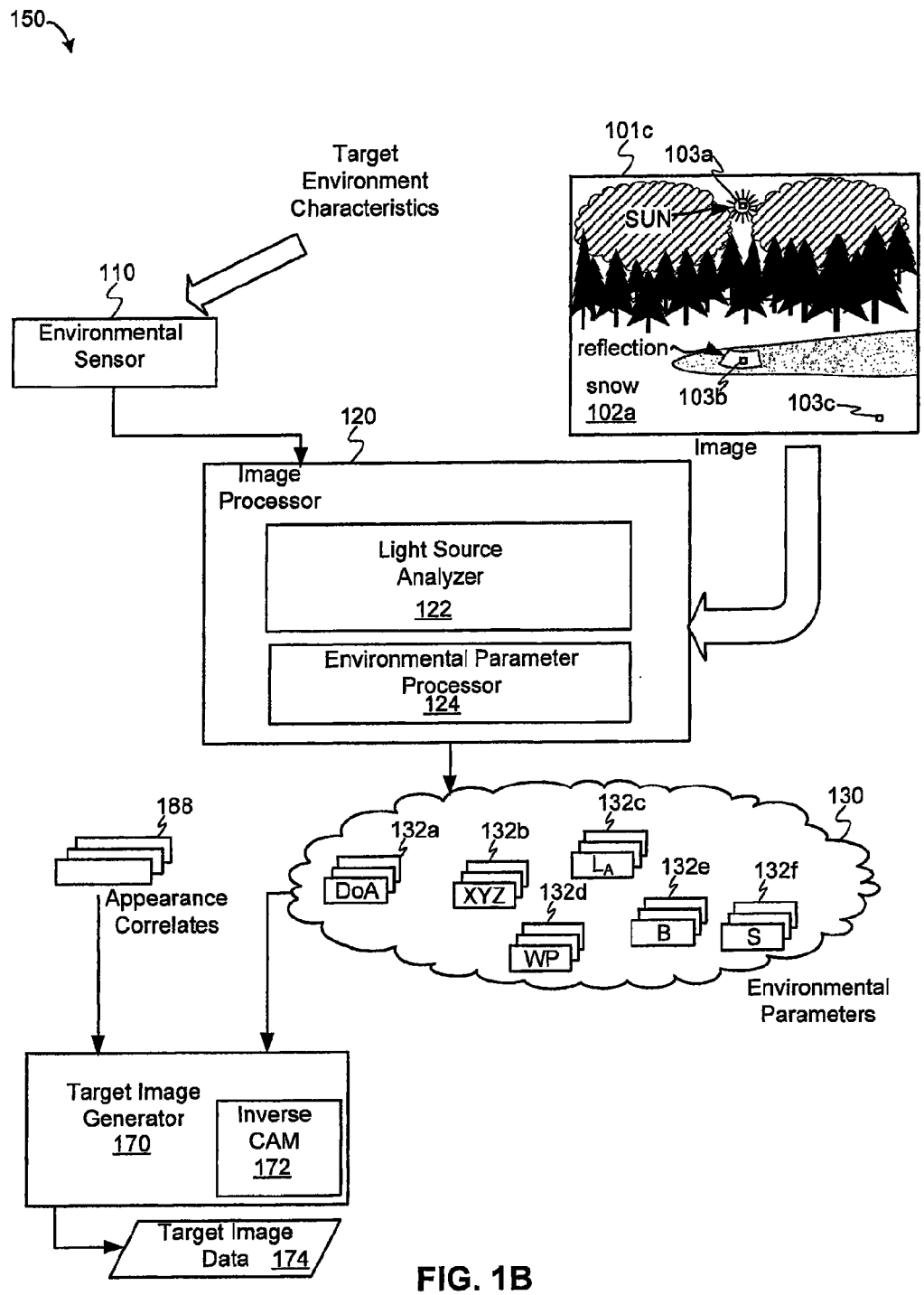
FIG. 1B is a diagram illustrating an example of a system for detecting light sources to match color at a target environment, according to at least some embodiments of the invention.

FIG. 1B is a diagram illustrating an example of a system for detecting light sources to match color at a target environment, according to at least some embodiments of the invention. As shown, system 150 includes an image processor 120 and a target image generator 170, and system 150 is configured to process images at a target environment. Image processor 120 is configured to generate environmental parameters 130, which are used by target image generator 170 to generate target image data 174 that are configured to reproduce the color appearance at a display at the target environment of FIG. 1B. Image processor 120 and target image generator 170 cooperate to reproduce image 101*c* from a source environment so that the colors in image 101*c* appear to be the same or similar at the target environment. Image processor 120 is shown to include a light source analyzer 122 and an environmental parameter processor 124, both of which can include structures and/or functions as described in FIG. 1A for similarly-name elements. Environmental sensor 110 is configured to detect target environment characteristics, including characteristics of an illuminant at the target environment. Image processor 120 generates environmental parameters 130, which are similar to those described in FIG. 1A, but are based on the target environment rather than the source environment. In some embodiments, parameters 130 and appearance correlates 188 are consumed by an inverse color appearance model ("Inverse CAM") 172 to generate target image data 174 that can be displayed. In view of the foregoing, image processor 120 and at least some of its constituents can detect one or more light sources in image 101*c*, as well as distinguish light sources from non-light sources, as described similarly in FIG. 1A.

Figure 2:
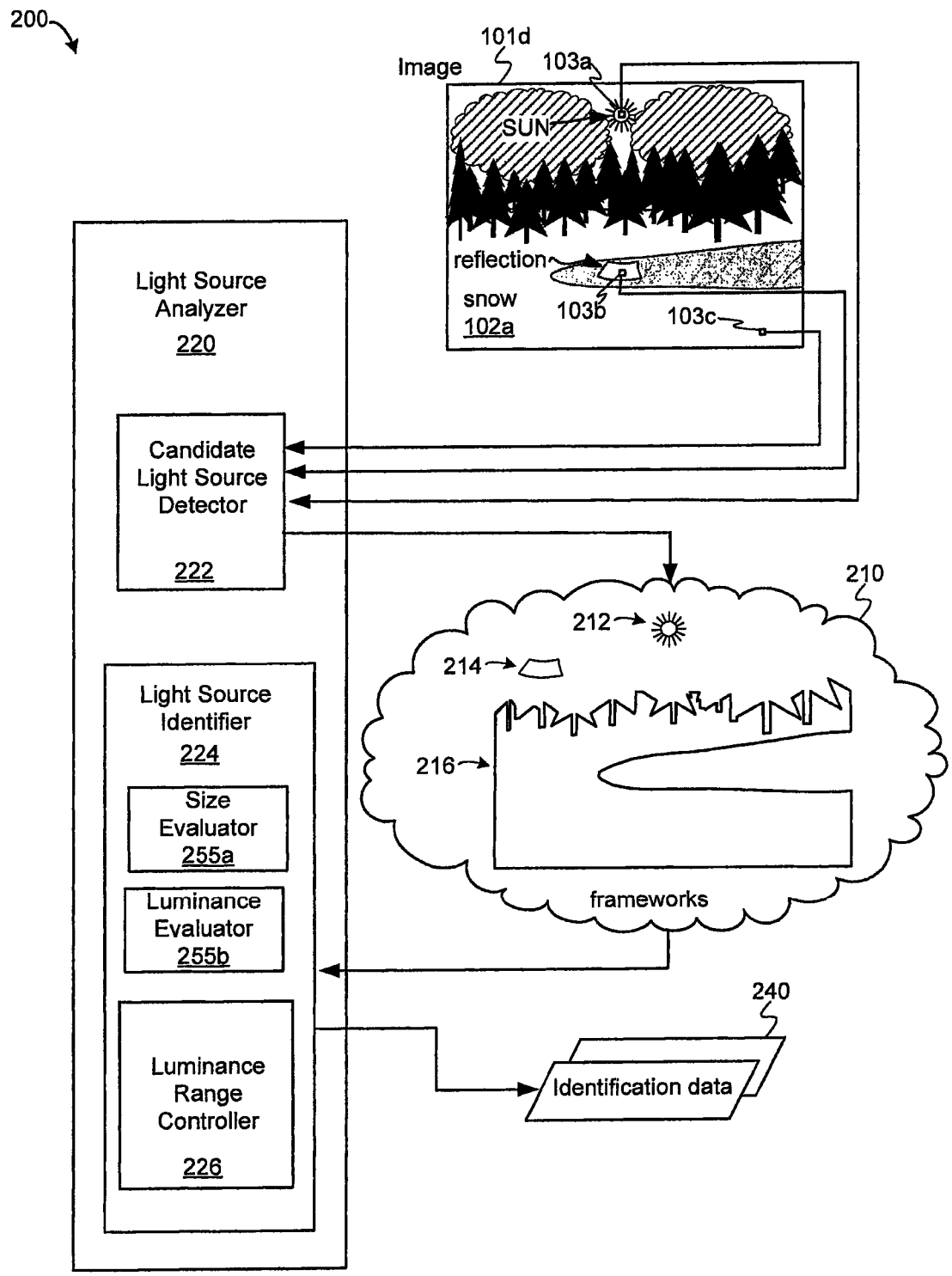
FIG. 2 depicts an example of a light source analyzer, according to a specific embodiment of the invention.

FIG. 2 depicts an example of a light source analyzer, according to a specific embodiment of the invention. Diagram 200 shows that light analyzer 220 includes a candidate light source detector 222 and a light source identifier 224. Candidate light source detector 222 is configured to analyze image 101*d*, and, more specifically, pixels 103*a*, 103*b*, and 103*c*, to detect candidate light sources. In at least one embodiment, a pixel that is part of a potential light source is first identified as being part of a candidate light source. For example, a pixel can be determined to be part of a candidate light source based on a function of the luminance of the pixel and surrounding pixels. Then, light source identifier 224 operates to examine the pixel to determine whether the pixel relates to a framework that qualifies as a candidate light source. As in the example shown in FIG. 1B, candidate light source detector 222 determines frameworks 210, which includes a framework 212 for the sun (e.g., a physical light source), a framework 214 for a reflection of the sun (e.g., a specular reflection as a perceived light source), and framework 216 for the snow-covered ground illuminated by the sun (e.g., a diffuse reflection and not perceived as a light source). In the example shown, candidate light source detector 222 determines frameworks as a function of at least the luminance values of one or more pixels associated with the frameworks. In some embodiments, candidate light source detector 222 can be configured to analyze the texture or characteristics of the candidate light source to differentiate between perceived light sources and relatively high luminance reflective objects, such as in a scene where no brighter element exists (e.g., there is no physical light source) other than an diffusively reflective object is present (e.g., white napkins, paper or wedding dresses). In some embodiments, candidate light source detector 222 can be referred to as a "light source detector." In some embodiments, a light source detector need not be limited to determining candidate light sources and can determine the light sources without determining candidate light sources.

Light source identifier 224 is configured to identify one or more pixels for frameworks 210 as either a light source (e.g., an image portion perceived as being self-luminous) or a non-light source (e.g., a diffusively reflective surface in an image portion) as a function of framework characteristics. Examples of framework characteristics include an area of a framework (e.g., including a quantity of pixels), and one or more values representative of luminance values for a framework. Another example of a framework characteristic includes a size or proportion of area (e.g., expressed as a percentage) of one candidate light source that includes higher luminance values (and appears lighter) relative to another candidate light source that includes lower luminance values (and appears darker). Also, a framework characteristic can include a size that is defined by a number of layers (e.g., image pyramid layers or image difference pyramid layers) in which luminance values remain present in multiple layers as the pixels of the layers are blurred and downsampled, as discussed below in FIG. 3. Each of the framework characteristics can be prioritized higher or weighted more than others in the determination of light sources or non-light sources, according to some embodiments.

Light source identifier 224 can be configured to detect a light source by comparing an area composed of a first set of pixels to threshold criteria indicative of the area being self-luminous. To illustrate operation of light source identifier 224, consider that light source identifier 224 can match characteristics of frameworks 212 and 214 against sets of threshold criteria specifying whether the frameworks are light sources or non-light sources. In this instance, light source identifier 224 matches the characteristics of frameworks 212 and 214 against criteria defining a light source. In this example, frameworks 212 and 214 are identified as light sources. Further, light source identifier 224 also can match characteristics of framework 216 against the sets of threshold criteria specifying whether the frameworks are light sources or non-light sources. In this case, light source identifier 224 matches the characteristics of framework 216 against criteria defining a non-light source (e.g., criteria specifying that a framework is indicative of a reflective surface). In this example, framework 216 is identified as a non-light source. Light source analyzer 220 is configured further to generate identification data 240, which identifies frameworks as being associated with light sources, non-light sources, or neither light sources nor non-light sources (e.g., pixels with relatively low or negligible luminance values). In some embodiments, pixels associated with non-light sources (bright, higher luminance areas not perceived as self-luminous) and pixels associated with relatively low or negligible luminance values (e.g., dim or dark image portions) can be combined or aggregated. Thus, a binary map can be created where the value of 1 represents a light source and a value of 0 represents that a pixel is not part of a light source. Identification data 240 also includes data specifying the identities of the pixels associated with each of frameworks 210, and data specifying other framework characteristics, such as values representative of luminance for a framework.

According to some embodiments, light source identifier 224 is configured to identify light source as self-luminous image portions and non-light sources as reflective surfaces in other image portions, based on relative areas of the image portions. Light source identifier 224 includes a size evaluator 255a and a luminance evaluator 255b, according to some embodiments. Luminance evaluator 255b is configured to evaluate and characterize the luminance values for frameworks 210 based on the pixel data. Note that as used herein, the term "value" can refer, in at least some embodiments, to an absolute magnitude, a measured or a calculated magnitude, an average magnitude, or any other variant that can be used to characterize a framework, a parameter, or a condition. For example, a luminance value can refer to one or more luminance values, and can be based on a highest luminance value, an average luminance value, or other variants that are suitable to characterize luminance of a framework. In the example shown, consider that luminance evaluator 255b determines that a luminance value (e.g., an average luminance value) of framework 212 is greater than that of framework 216. Further, framework 212, as the sun, can have a higher perceived lightness than framework 216, as the snow-covered ground. Size evaluator 255a is configured to evaluate and characterize the size (e.g., in terms of quantity of pixels, area, or relative area) for a framework 210.

In the example shown, consider that size evaluator 255a determines that the size of framework 216 is greater than that of framework 212. Light source identifier 224 can be further configured to determine the proportion of the area of framework 212 to the area of framework 216. If the relative area of framework 212 is less than an area specifying a light source, then framework 212 is identified as a light source. For example, if the relative area of framework 212 is less than 5% of the total area that includes frameworks 212 and 216, then framework 212 can be perceived as self-luminous. Light source identifier 224 is configured to operate, at least in some embodiments, consistent with an observation that when an area of a darker image portion is sufficiently larger than an area of a lighter image portion, the darker image portion can be perceived as white and lighter image portion can be perceived as self-luminous. In some embodiments, light source identifier 224 can be further configured to detect that the area associated with pixels for framework 216 is greater than an area threshold that specifies a reflective surface. As a larger and darker image portion that can include a reflective surface, framework 216 can be perceived as white, and thus can serve as an anchor to a reference white in image 101d. Thus, light source identifier 224 can identify framework 216 as a non-light source as framework 216 has a relatively larger area than framework 212. Note that in various embodiments, a range of relative areas or sizes specify whether a lighter image portion is a light source. Note further that when an area of a darker image portion is equal to or less than an area of a lighter image portion, the relative luminance values control, at least in one embodiment. Thus, the lighter image portion can be perceived as white. In this case, both frameworks 212 and 216 are non-light sources when darker image portion is equal to or less than an area of a lighter image portion.

In some embodiments, light source identifier 224 can be configured to include a luminance range controller 226 that is configured to scale luminance ranges for light sources differently than non-light sources. To illustrate, consider that image 101d is associated with a low dynamic range ("LDR") of luminance values (e.g., less than 2 orders of magnitude), and light source analyzer 220 is configured to identify light sources for reproduced images that are associated with a high dynamic range ("HDR") of luminance values (e.g., 5 orders of magnitude or greater). For example, light source identifier 224 can scale a range of luminance values to be generated by pixels of a light source to a first range, and can scale another range of luminance values to be generated by pixels of a non-light source to a second range, whereby the second range includes less luminance values than the first range. Thus, luminance range controller 226 can map light sources to an HDR range while mapping non-light sources to an LDR range.

Figure 3:
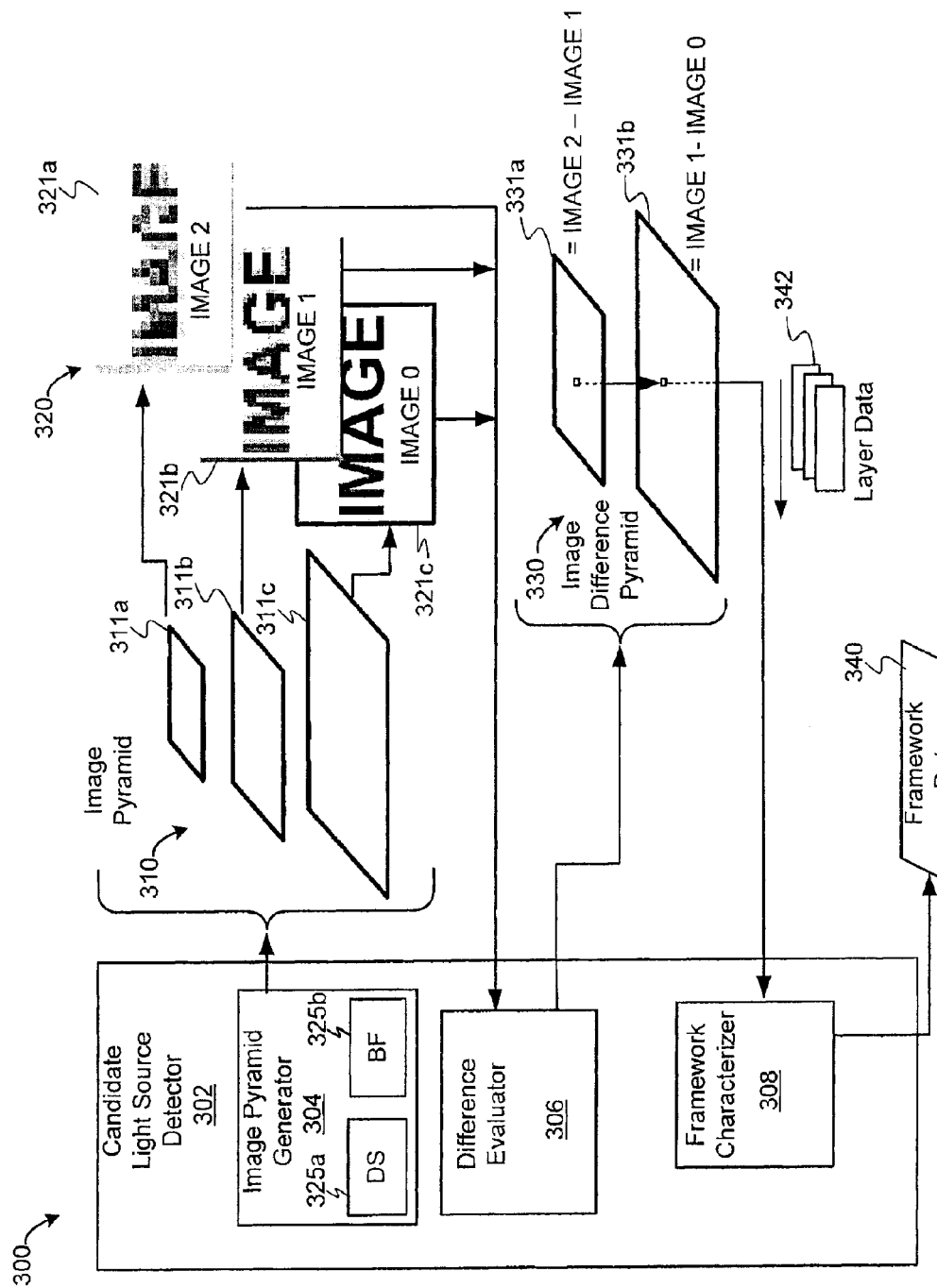
FIG. 3 depicts an example of a candidate light source detector, according to some embodiments of the invention.

FIG. 3 depicts an example of a candidate light source detector, according to some embodiments of the invention. Diagram 300 depicts a candidate light source detector 302 that includes an image pyramid generator 304, a difference evaluator 306, and a framework characterizer 308. Candidate light source detector 302 is configured to determine the luminance channel of an image (e.g., the luminance values derived from pixel data), and analyze whether the groups of luminance values for the pixels constitute a framework for either a light source or a non-light source. In the example shown, image pyramid generator 304 is configured to generate multiple versions of an image in an image pyramid 310, whereby the multiple versions are downsampled images of the image. Image pyramid 310 is depicted as pyramid 320 as having progressively blurred images. Image pyramid generator 304 blurs the multiple images and downsamples the blurred images progressively as the number of pixels in the downsampled images decreases. As shown, image pyramid generator 304 includes a downsampler ("DS") 325a configured to generate a downsampled image 311b of image 311c, and to generate a second downsampled image 311a based on first downsampled image 311b. Image 311c is the initial image ("Image 0") 321c prior to downsampling and blurring operations. In some embodiments, downsampler 325a operates to downsample image 311a to form additional downsampled images (not shown) until a downsampled image includes, for example, 1 to 4 pixels. In some embodiments, downsampled image 311b includes half the number of pixels as image 311c, and downsampled image 311a includes half the number of pixels as image 311b. Note that the downsampling can be by any amount of pixels and is not limited to half the number of pixels.

In at least some embodiments, blurring filter ("BF") 325b is configured to blur image 311c prior to forming downsampled image 311b. In particular, blurring filter 325b is configured to blur initial image 311c, which is image ("image 0") 321c of initial resolution. Downsampler 325a is configured to reduce the size of blurred image 311c by eliminating pixels to form image 311b, which is depicted as image ("image 1") 321b. Blurring filter 325b blurs image 311b, which is depicted as image ("image 1") 321b, and downsampler 325a is configured further to downsample blurred image 311*b* to form a blurred, downsampled image 311*a*, which is depicted as image ("image 2") 321*a*. Image pyramid generator 304 is configured to recursively blur and downsample (or vice versa) other image pyramid layers (not shown). In some embodiments, blurring filter 325*b* is a low-pass filter. In at least one embodiment, blurring filter 325*b* is configured to perform a Gaussian blur operation.

Difference evaluator 306 is configured to generate an image difference pyramid 330 that includes data representing result images 331*a* and 331*b*. In particular, difference evaluator 306 can be configured to calculate the differences between sets of data representing luminance values from two images in multiple versions of the image pyramid 310. For example, the difference between image 321*b* and image 321*c* can yield result image 331*b*, whereas the difference between image 321*a* and image 321*c* can yield result image 331*a*. Other possible result images are not shown. Framework characterizer 308 is configured to determine layer data 342, which indicate a number of resultant images that include a candidate light source in image difference pyramid 330. Further, framework characterizer 308 generates framework data 340 that identifies relevant frameworks and corresponding pixels, as well as a number of layers through which a framework passes. Framework data 340 then can be transmitted to a light source identifier, such as light source identifier 224 of FIG. 2, to determine light sources from non-light sources.

In some embodiments, image pyramid generator 304 and a difference evaluator 306 cooperate to determine differences between luminance values (e.g., to detect changes in luminance by moving spatially from pixel to pixel to detect luminance value changes from light to dark or vice versa) in layers of image pyramid 310. Image generator 304 can determine a first set of values that are representative of changes in luminance values in image 321*c* that indicate a boundary for a first group of pixels in the image. The differences of values at the boundary indicate changes in luminance (or gray level, between dark/black to light/white) present in the original image 321*c* over a relatively small spatial distance. For example, a difference of "0" indicates there are no changes, where a positive difference and a negative difference indicate an increase and a decrease, respectively, in luminance values. The relatively high spatial frequency at the boundary indicates a candidate light source for a layer including image 321*c*. Blurring filter 325*b* is configured to distribute (e.g., using a Gaussian blur operation) the first set of values representative of the changes in the luminance values over neighboring pixels to form distributed values representative of the changes in the luminance values in another image, such as image 311*b*. Downsampler 325*a* downsamples the other image to form image 311*b* that includes a second set of values representative of changes in luminance values that indicate another boundary for a second group of pixels. Difference evaluator 306 subtracts the second set of values by the first set of values to define a candidate light source. Note that in some embodiments, image pyramid generator 304 and a difference evaluator 306 cooperate to implement a difference of Gaussians function that subtracts a blurred version of image 311*c* from a less blurred version of image 311*c*, thereby yielding boundaries of candidate light sources.

Figure 4A:
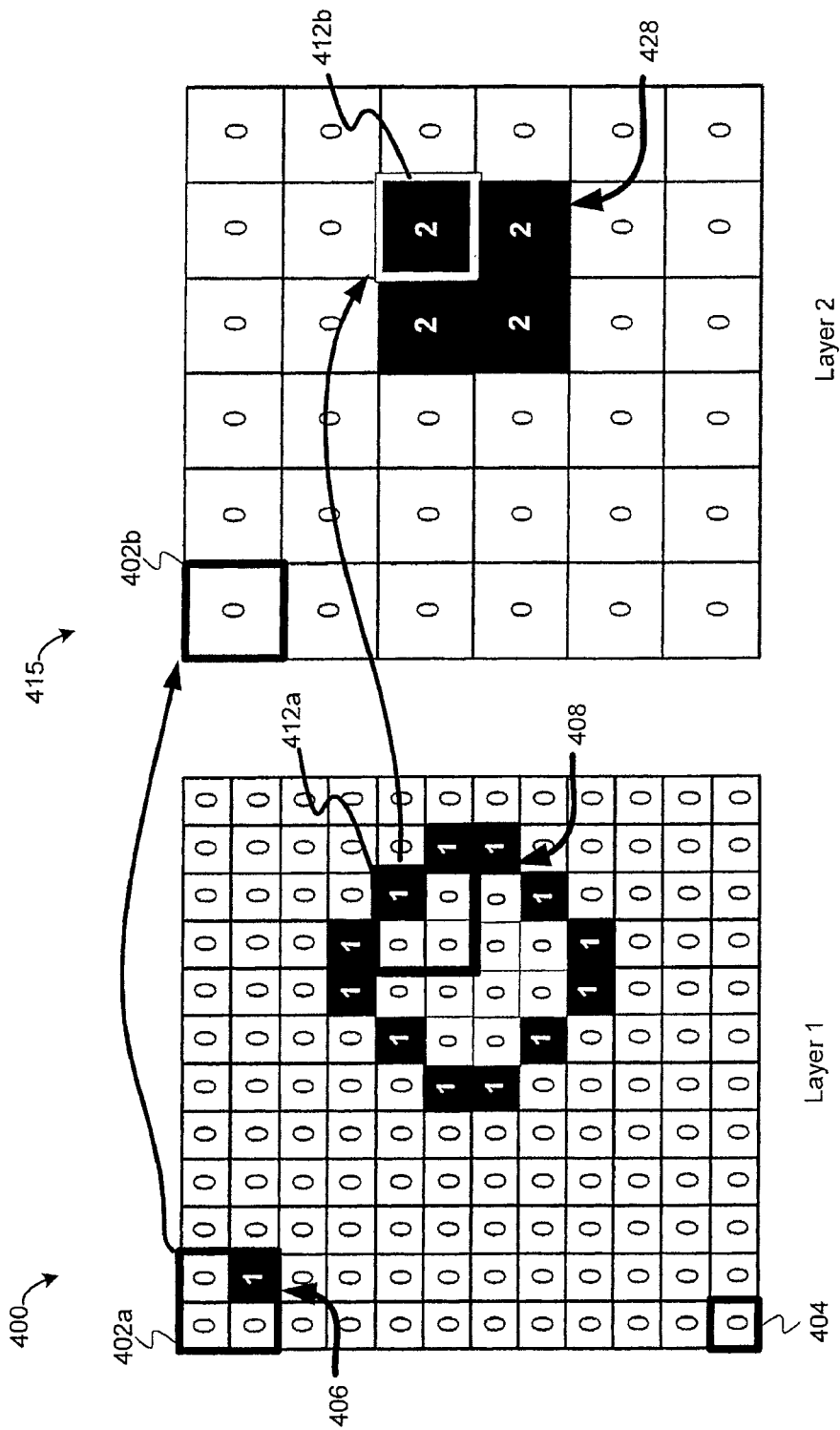
FIGS. 4A to 4C depict examples of determining candidate light sources, according to some embodiments.
Figure 4B:
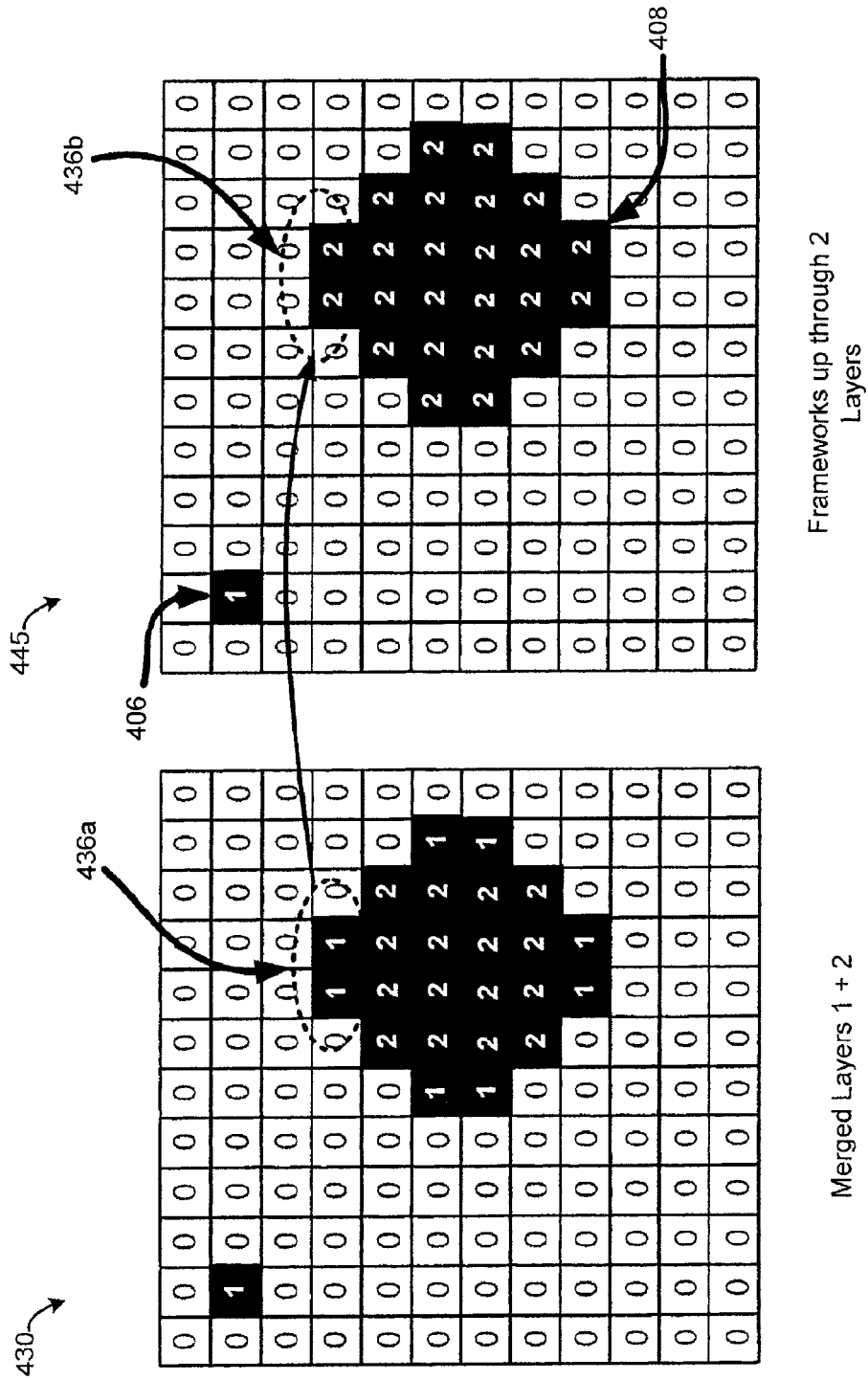
Figure 4C:
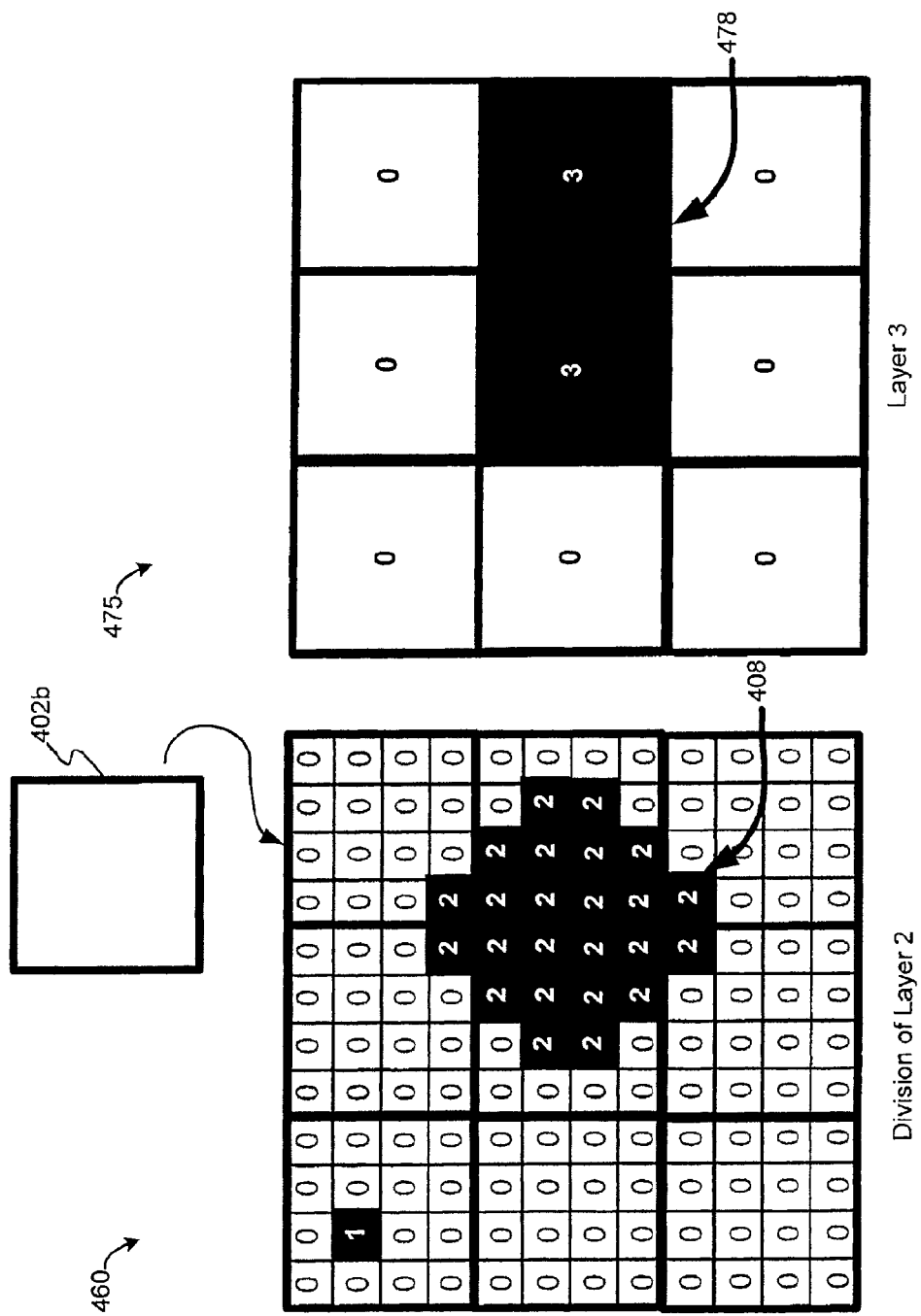

FIGS. 4A to 4C depict examples of determining candidate light sources, according to some embodiments. Image 400 of FIG. 4A is shown to include values of zero or a layer number for each pixel 404 in a layer 1 of an image pyramid, whereby the layer number indicates that a pixel is associated with at least a positive threshold value of the difference of two consecutive layers. For example, a threshold value of luminance can be an average luminance value determined for a candidate light source at layer prior to blurring or downsampling. In this example, image 400 has the same number of pixels (i.e., same resolution) as an initial image. To detect a candidate light source for layer 1, a candidate light source detector can detect a value change from a pixel associated with zero to a pixel associated with a value larger than zero. Thus, a candidate light source detector can detect changes in luminance levels to detect a candidate light source 406 and a candidate light source 408, both of which have luminance values above a threshold luminance value.

Next, the candidate light source detector distributes the luminance values over neighboring pixels by way of a Gaussian blur operation. For example, a Gaussian kernel of 5×5 pixels (or any other number of pixels) can be used to blur the image associated with layer 1. Then, layer 1 is downsampled. As such, the luminance value of candidate light source 406 is distributed over, for example, a group 402*a* of pixels. Note that group 402*a* of pixels corresponds to pixel 402*b* in layer 2, which include a downsampled image. In this example, the distributed values of the luminance value for candidate light source 406 are less than the threshold luminance value. Thus, candidate light source 406 is not present in image 415 of layer 2. As the number of layers through which a candidate light source passes indicates a relative size, candidate light source 406 is understood to be a relatively small (e.g., point-sized) light source. Similarly, the luminance values of candidate light source 408 are distributed over, for example, a group pixels that include a sub-group 412*a* of pixels. Note that sub-group 412*a* of pixels corresponds to pixel 412*b* in the downsampled image of layer 2. In this example, the distributed values of the luminance value for candidate light source 408 are at least great enough to meet the threshold luminance value. Thus, candidate light source 408 is present as candidate light source 428 in image 415 of layer 2.

As shown in FIG. 4B, the candidate light source detector merges layers 1 and layer 2 to determine an image 430, and then analyzes layer number associated with the pixels. If a pixel, such as one of pixels 436*a*, is adjacent to a pixel with a higher layer number, then the lower layer number is set to the higher layer number. For example, pixels 436*a* are set to layer number 2 as pixels 436*b* in image 445. Thus, the merged layers in image 445 indicate a framework 406 of a light source in one (1) layer and another framework 408 that extends through two (2) layers, thereby signifying that framework 408 is larger than framework 406.

FIG. 4C depicts pixels in image 445 of FIG. 4B that correspond to a downsampled pixel 402*b* in image 460. As shown, downsampled pixel 402*b* includes 16 pixels in the initial image 400. The candidate light source detector then can blur the candidate light sources and downsample image 460 to determine downsampled image 475. In this example, the distributed values of the luminance value for candidate light source 408 are at least great enough to meet the threshold luminance value. Thus, candidate light source 408 is present as candidate light source 478 in image 475 of layer 3. The candidate light source detector then merges layer 2 and layer 3, and continues the previously-described actions until a downsample image includes an ending number of pixels, such as 1, 2 or 4 pixels.

Figure 5:
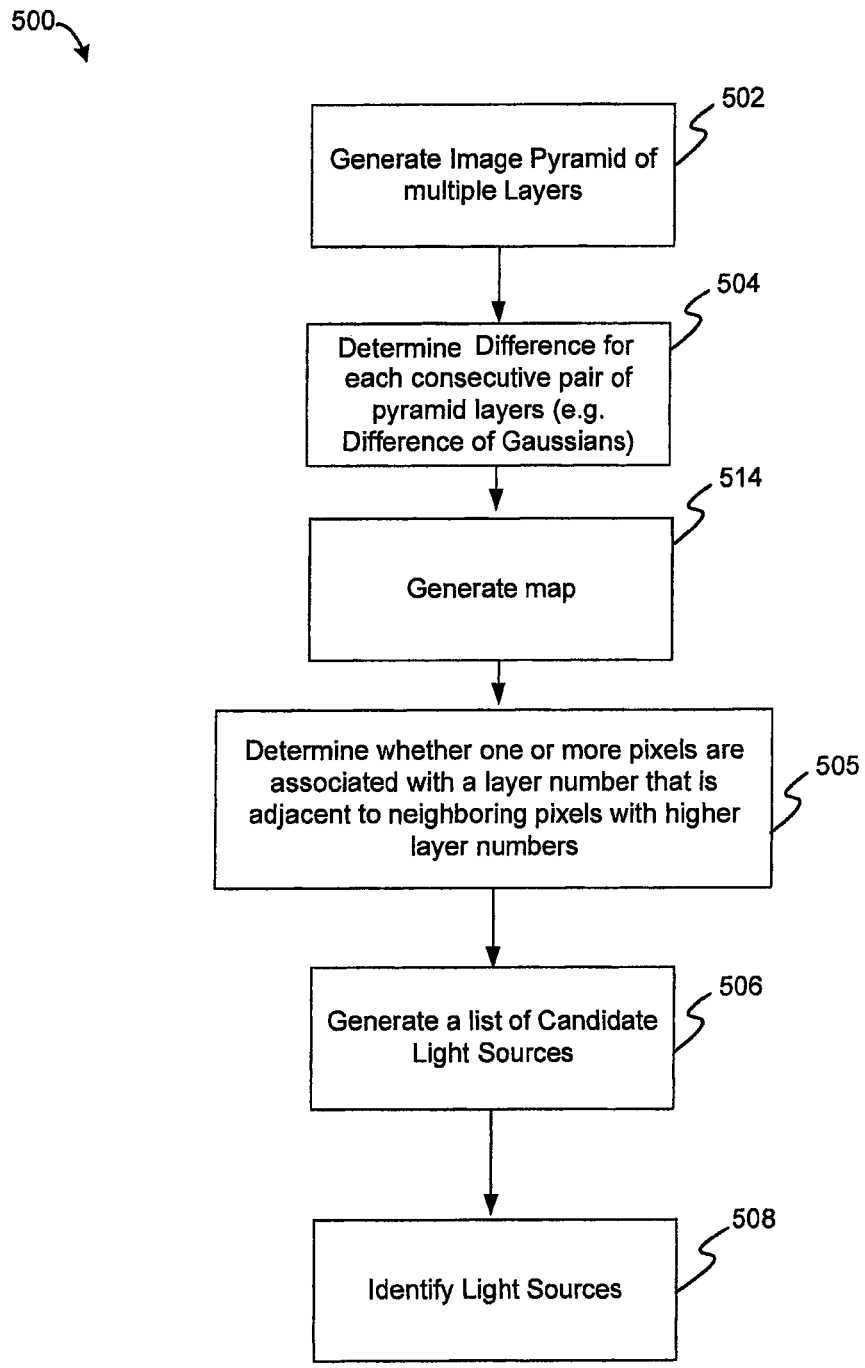
FIG. 5 depicts a flow as an example of a method of detecting light sources, according to some embodiments of the invention.

FIG. 5 depicts a flow as an example of a method of detecting light sources, according to some embodiments of the invention. First, flow 500 generates an image pyramid at 502. At 504, flow 500 determines pyramid layers by determining the differences of Gaussians to form resultant image. At 514, the difference of Gaussian pyramid layers get thresholded by a positive value (e.g., 0.02) and a map is created. In some instances, the map is of binary nature. At 505, a determination is made whether one or more pixels associated with a layer number of a resultant image are adjacent to pixels with higher layer numbers. If so, then the lower layer numbered pixels are set to the higher layer numbers. At 506, candidate light sources are identified. A light source identifier then identifies light sources at 508, thereby distinguishing light sources from non-light sources.

Figure 6:
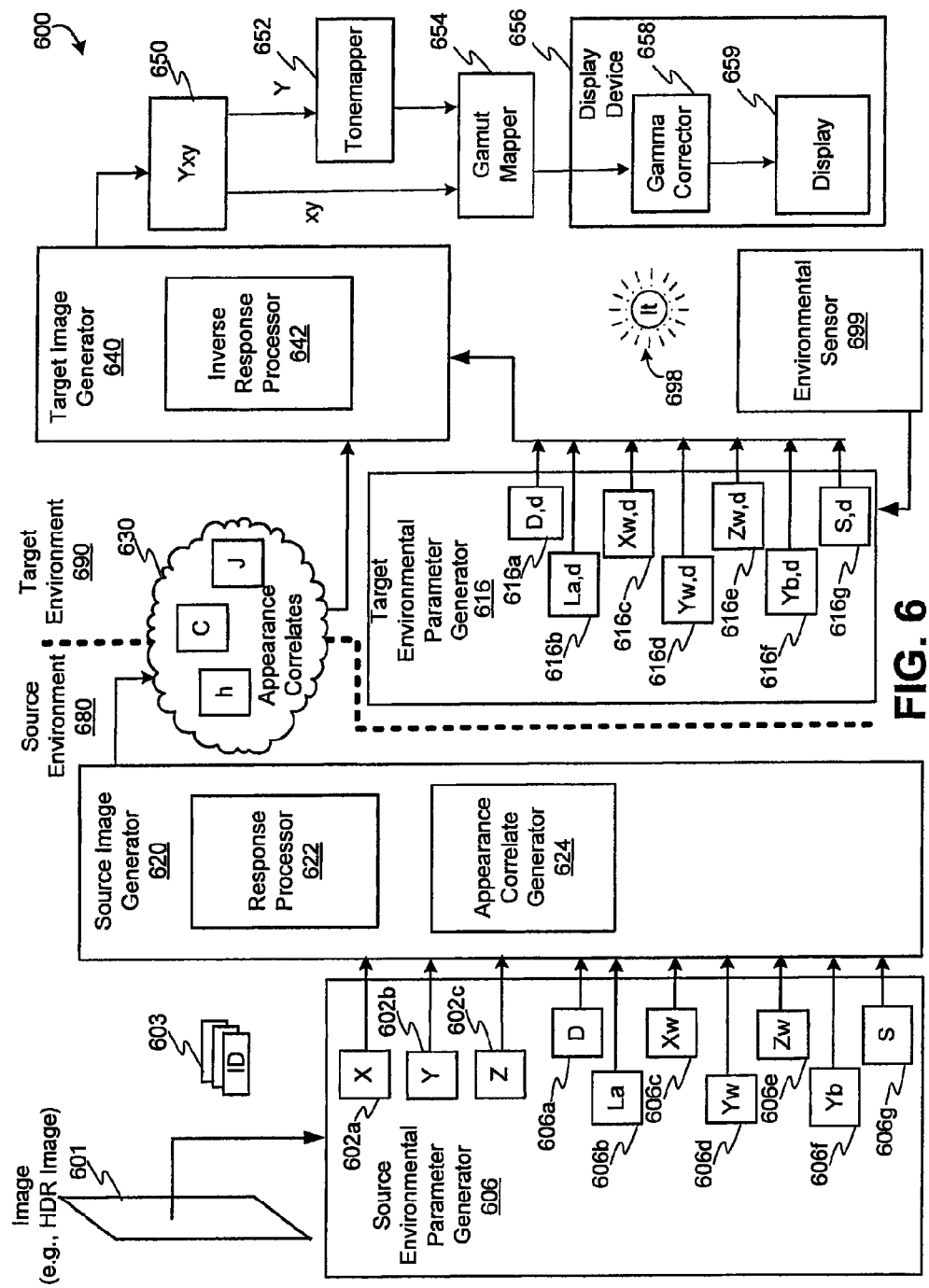
FIG. 6 depicts examples of a source image processor and a target image processor that use light source detection for facilitating color matching between different viewing conditions, according to various embodiments.

FIG. 6 depicts examples of a source image processor and a target image processor that use light source detection for facilitating color matching between different viewing conditions, according to various embodiments. As shown in diagram 600, a source image generator 620 and a target image processor 640 are associated with a source environment 680 and a target environment 690, respectively. Source image generator 620 can include a response processor 622 and an appearance correlate generator 624, and target image processor 640 can include an inverse response processor 642. Response processor 622 is configured to perform chromatic adaptation to generate responses (e.g., transformed cone space responses). Response processor 622 can be configured to receive data representing the following color channel values in a cone color space: a long tristimulus value ("L"), a medium tristimulus value ("M"), and a short tristimulus value ("S") for non-linearly transforming L, M, and S into transformed response values. Response processor 622 can operate in accordance with any CAM. Appearance correlate generator 624 is configured to generate appearance correlates 630 including, but not limited to, a lightness correlate ("J"), a chroma correlate ("C"), and a hue correlate ("h"). Inverse response processor 642 can cooperate to match a color associated with, for example, an image 601 (and pixels thereof) to a corresponding color at display device 656 so that they are perceptibly the same, according to a human visual system, for example. Inverse response processor 642 can operate in accordance with any inverse CAM. An example of image 601 is an HDR image. Source image generator 620 can be implemented in hardware and/or software, and can be included in an image capture device, such as a camera, in a computing device, or in a communications device. Target image processor 640 can be implemented in hardware and/or software, and can be included in or used in association with a CRT monitor, LCD display, a projection device, or any image display device.

Source image generator 620 can be configured to generate appearance correlates 630 based on parameters associated with source environment 680. Source image generator 620 can be configured to receive source environmental parameters generated by source environmental parameter generator 606. For example, source environmental parameter generator 606 can generate tristimulus values ("X") 602a, ("Y") 602b, and ("Z") 602c for each pixel from, for example, the R, G and B pixel data values. Source environmental parameter generator 606 can include an adapting luminance generator (not shown) and a degree of adaptation generator (not shown), both of which are described herein, to generate a luminance of the adapting field ("La") 606b and a degree of adaptation ("D") 606a, respectively, based on image 601. Source environmental parameter generator 606 also can include a light source identifier (not shown), which is described herein, to determine a non-light source that can serve as an anchor for a reference white for image 601. Thus, source environmental parameter generator 606 can generate tristimulus values for a source-side white point, such as values ("Xw") 606c, ("Yw") 606d, and ("Zw") 606e. Source environmental parameter generator 606 can include an image processor 120 (FIG. 1A) to generate parameter 132e (FIG. 1A) as a relative luminance factor of the background ("Yb") 606f, and to generate parameter 132f (FIG. 1A) as a surround luminance value ("S") 606g. According to various embodiments, parameters 606a to 606g can be generated either automatically (e.g., as described herein) or manually using colortiming or other equivalent processes and instruments. Also, parameters 606a to 606g can be associated with image 601 as metadata so that source image generator 620 can access it, or the parameters 606 can be supplied separate from image 601.

With respect to target environment 690, sources of target parameters 616a to 616g can be similarly determined by target environmental parameter generator 616. In some embodiments, an environmental sensor 699 receives light from an illuminant ("It") 698 at target environment 690. Target image generator 640 can generate xy chromaticity values 650 in, for example, the CIE xyY colorspace. Tonemapper 652 can be configured to map luminance levels for high dynamic ranges to luminance levels for low dynamic ranges. In some embodiments, tonemapper 652 can be configured to drive the compression with different parameters for light sources and non-light sources. This can provide control over perceived light sources, including an amount of clipping. Gamut mapper 654 can be configured to adjust the color of image 601 to fit into the constrained color gamut of display device 656, which can be a CRT monitor, LCD display, a projection device, or any image display device. Display device 656 can include a gamma corrector 658 to correct for the nonlinear relationship between a pixel value and the displayed intensity for a monitor. Display device 656 can also include display 659 upon which colors for 601 can be reproduced.

As shown, diagram 600 depicts source image generator 620 and target image generator 640 being configured to match colors (e.g., by perceptibly matching colors) of HDR image 601 between a source environment 680 and a target environment. An HDR image 601 can be associated with a range of luminance levels that provide a greater amount of contrast between luminance levels than a low dynamic range. In some cases, an amount of contrast can be determined by the ratio between a higher (e.g., highest) luminance value and a lower (e.g., lowest) luminance value. Optionally, tonemapper 652 is shown to provide optional tone reproduction (or tone mapping) to subsequently compress a range of luminance values for HDR image 601 into a smaller range of luminance values to, for example, display image 601 using display device 656. Thus, display device 656 can be a low dynamic range ("LDR") device that is capable of providing for a low dynamic range of luminance values (e.g., about 2 to 3 orders of magnitude). In some embodiments, source image generator 620 and target image generator 640 can be configured to match colors extending the range of luminance values associated with image 601. For example, consider that image 601 is associated with a low dynamic range of luminance values (e.g., about 2 to 3 orders of magnitude). In some embodiments, source image generator 620 and target image generator 640 (of FIG. 6 or otherwise described herein) can be configured to expand the range of luminance values from a low dynamic range of luminance values to a high dynamic range of luminance values (e.g., about 3 to 4 or more orders of magnitude) with or without color appearance matching. Thus, source image generator 620 and target image generator 640 can cooperate to provide, for example, the display of an image in HDR at a target environment, with the image being captured at a source environment using LDR technology.

Figure 7:
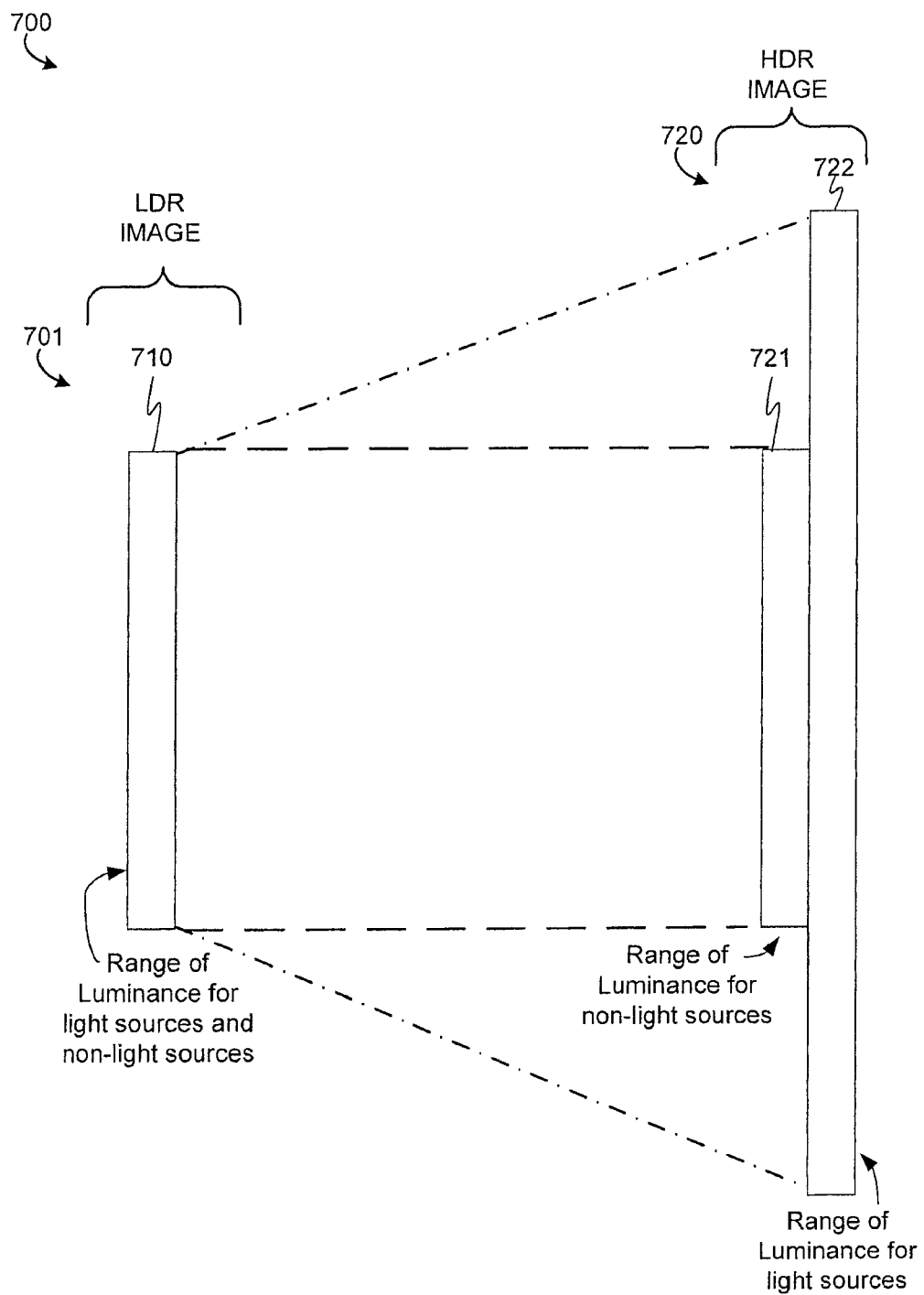
FIG. 7 is a diagram illustrating the functionality of a luminance range controller, according to some embodiments of the invention.

FIG. 7 is a diagram 700 illustrating the functionality of a luminance range controller, according to some embodiments of the invention. Consider that an image 701 is associated with a low dynamic range ("LDR") 710 of luminance values (e.g., less than 2 orders of magnitude). Range 710 includes luminance values for both light sources and non-light sources. A luminance range controller 226 (FIG. 2) can map the luminance values for light sources differently than for non-light sources to display an HDR image 720 (or on an HDR-capable display). In particular, the luminance range controller can map range 710 of luminance values for light sources to range 722 for light sources on an HDR display, whereas range 710 for non-light sources can be mapped to range 721 on the HDR display.

Figure 8:
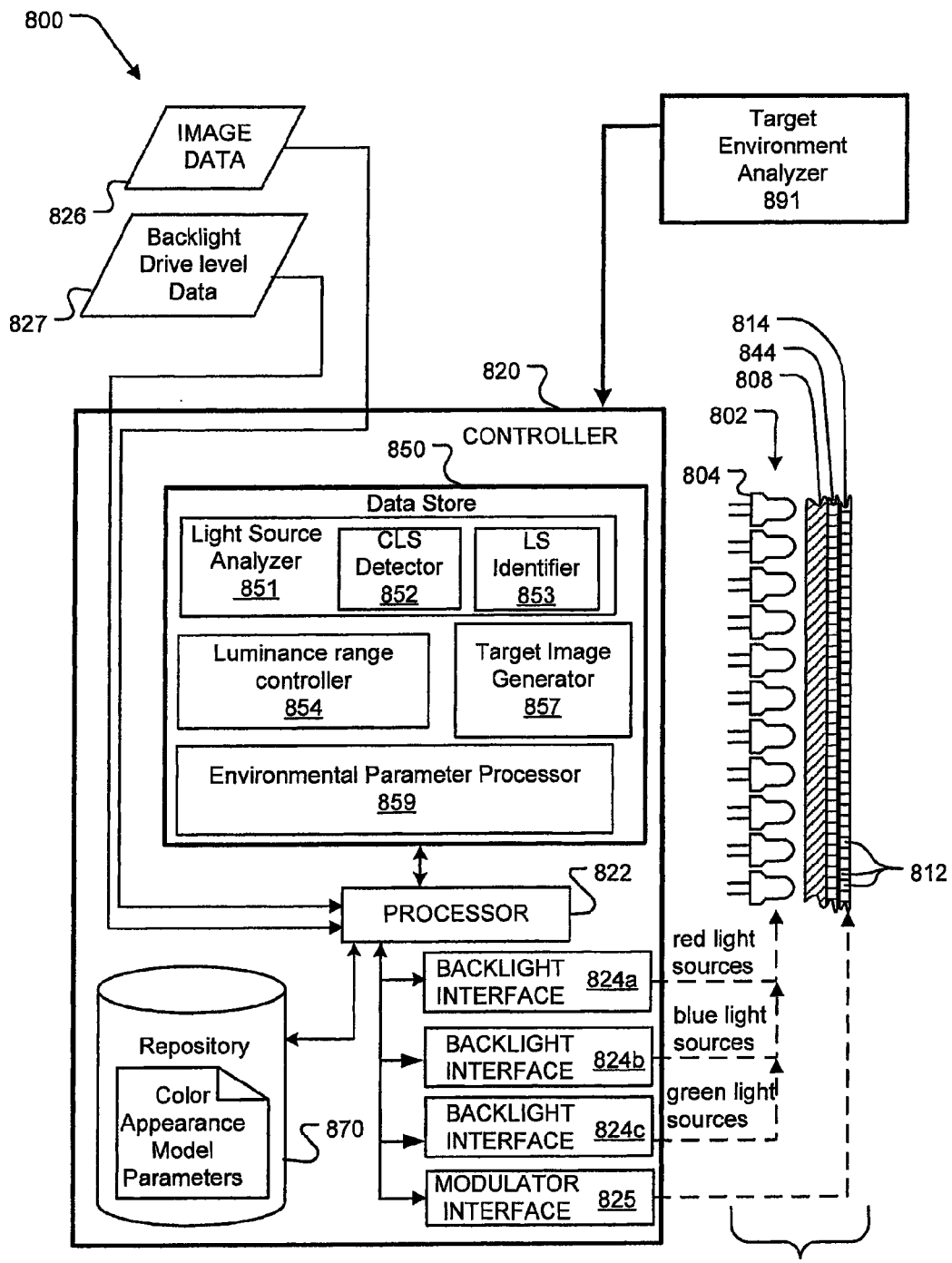
FIG. 8 is a schematic diagram of a controller configured to operate a display device having at least a front modulator, according to at least some embodiments of the invention.

FIG. 8 is a schematic diagram of a controller configured to operate a display device having at least a front modulator, according to at least some embodiments of the invention. System 800 includes a controller 820 configured to be coupled to a display device 890. Controller 820 can include a processor 822, a data store 850, a repository 870, and one or more backlight interface ("backlight interface") 824A configured to control a rear modulator, such as a backlight unit and its light sources, and an interface ("modulator interface") 824B configured to control a front modulator. Backlight interfaces 824a, 824b, and 825c are respectively configured to drive modulating elements 804, which can include an array of red light sources, an array of green light sources, and an array of blue light sources. Or, modulating elements 804 can include white light sources. According to at least some embodiments, controller 820 can be implemented in software, hardware, firmware, circuitry, or a combination thereof. Data store 850 can include one or more of the following modules: light source analyzer 851, which can include a candidate light source ("CLS") detector 852 and a light source ("LS") identifier 853, a luminance range controller 854, environmental parameter processor 859 (which can include a degree of adaptation generator), and a target image generator 857, which can include an inverse response processor of FIG. 6 to implement an inverse color appearance model. Each of these modules can include executable instructions for performing the functionalities described herein. Repository 870 can be configured to store data structures including data representing color appearance model data, including any parameter, as described herein. In some embodiments, target environment analyzer 891 can be configured detect or determine characteristics of the target environment, such as the white point of a target source illuminant. For example, environment analyzer 891 can be an environmental sensor configured to measure the viewing environment at a display, thereby facilitating automatic determination of the state of adaptation of the viewer, among other things. According to at least some embodiments, controller 820 can be implemented as hardware modules, such as in programmable logic, including an FPGA or equivalent, or as part of an ASIC. Further, one or more of the following modules can be implemented as firmware: light source analyzer 851, which can include a candidate light source detector 852 and a light source identifier 853, a luminance range controller 854, environmental parameter processor 859 (which can include a degree of adaptation generator), and a target image generator 857. In some embodiments, repository 870 can be implemented in programmable logic, including an FPGA.

Display device 890 can include a front modulator 814, a rear modulator 802, and optical structures 844 and 808 being configured to carry light from rear modulator 802 to front modulator 814. Front modulator 814 can be an optical filter of programmable transparency that adjusts the transmissivity of the intensity of light incident upon it from rear modulator 802. Rear modulator 802 can be configured to include one or more light sources. In some examples, rear modulator 802 can be formed from one or more modulating elements 804, such as one or more arrays of LEDs. The term rear modulator, as used herein in some embodiments, can refer to backlight, a backlight unit and modulated light sources, such as LEDs. In some examples, the rear modulator can include, but is not limited to a backlight having an array of controllable LEDs or organic LEDs ("OLEDs"). In some examples, front modulator 814 may comprise an LCD panel or other transmission-type light modulator having pixels 812. Front modulator 814 can be associated with a resolution that is higher than the resolution of rear modulator 802. In some embodiments, front modulator 814 may include, but is not limited to an LCD panel, LCD modulator, projection-type display modulators, active matrix LCD ("AMLCD") modulators, and other devices that modulate a light and/or image signal. Optical structures 844 and 808 can include elements such as, but not limited to, open space, light diffusers, collimators, and the like. In some examples, front modulator 814 and rear modulator 802 can be configured to collectively operate display device 890 as an HDR display, or in some embodiments, as an LDR display.

In some embodiments, controller 820 can be configured to provide front modulator drive signals, based upon input image 826 and backlight drive level data 827, to control the modulation of transmissivity associated with LCD pixels 812 of front modulator 814, thereby collectively presenting a desired image on display device 890. Although not shown, controller 820 may be coupled to a suitably programmed computer having software and/or hardware interfaces for controlling rear modulator 802 and front modulator 814 to display an image specified by data corresponding to input image 826. It may be appreciated that any of the elements described in FIG. 8 can be implemented in hardware, software, or a combination of these. In some embodiments, controller 820 can be implemented in projection-based image rendering devices and the like.

Figure 9:
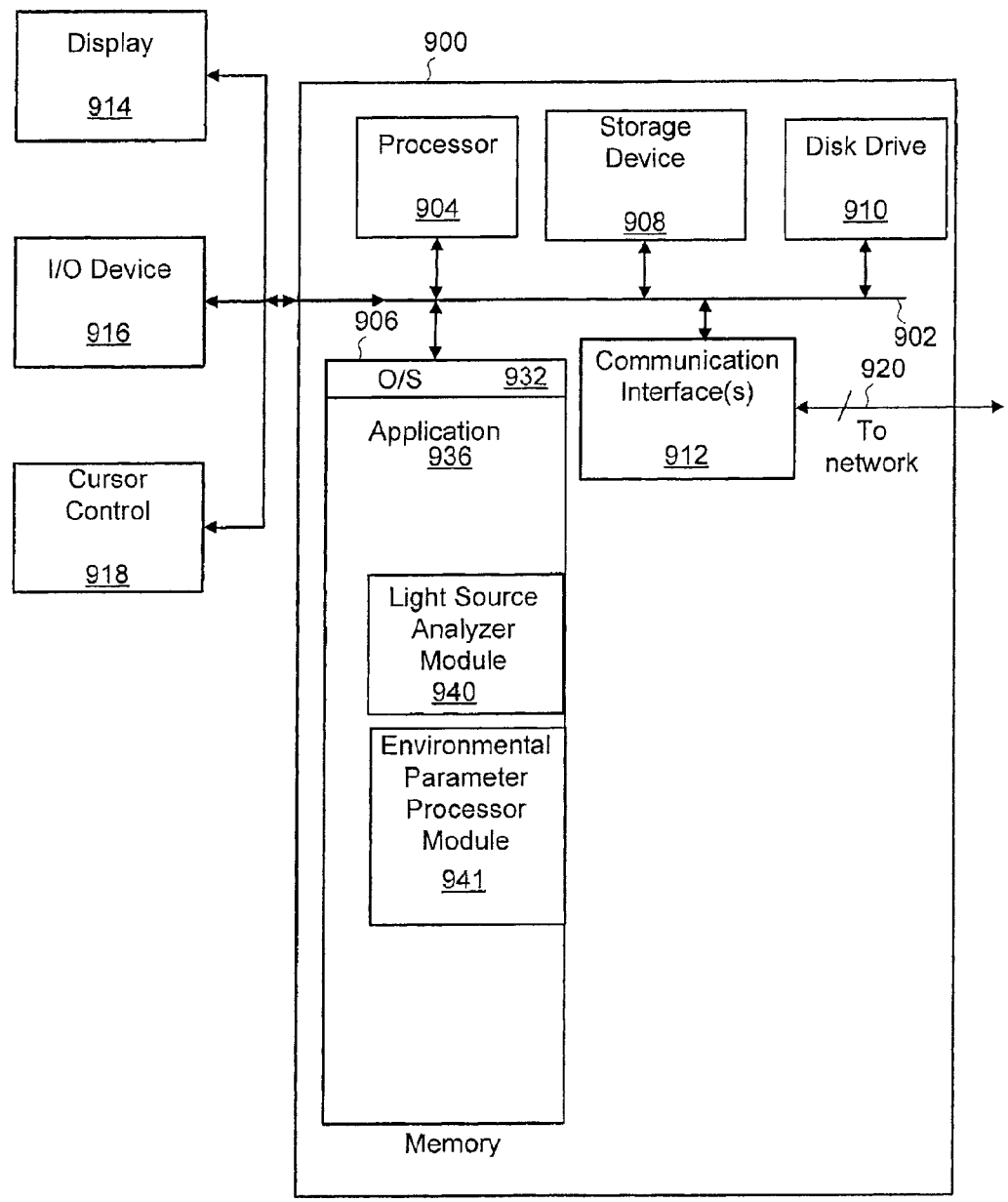
FIG. 9 illustrates an exemplary computer system suitable for matching color in different viewing environments using light source detection, according to at least one embodiment of the invention.

FIG. 9 illustrates an exemplary computer system suitable for matching color in different viewing environments using light source detection, according to at least one embodiment of the invention. In some examples, computer system 900 can be used to implement computer programs, applications, methods, processes, or other software to perform the above-described techniques and to realize the structures described herein. Computer system 900 includes a bus 902 or other communication mechanism for communicating information, which interconnects subsystems and devices, such as one or more processors 904, system memory ("memory") 906, storage device 908 (e.g., ROM), disk drive 910 (e.g., magnetic or optical), communication interface 912 (e.g., a modem, Ethernet card, or any other interface configured to exchange data with a communications network or to control a fabrication machine), display 914 (e.g., CRT or LCD), input device 916 (e.g., keyboard), and pointer cursor control 918 (e.g., mouse or trackball).

According to some examples, computer system 900 performs specific operations in which processor 904 executes one or more sequences of one or more instructions stored in system memory 906. Such instructions can be read into system memory 906 from another computer readable medium, such as static storage device 908 or disk drive 910. In some examples, hard-wired circuitry can be used in place of or in combination with software instructions for implementation. In the example shown, system memory 906 includes modules of executable instructions for implementing an operation system ("O/S") 932, an application 936, a light source analyzer module 940, and environmental parameter processor module 941, which can provide functionalities described herein.

The term "computer readable medium" refers, at least in one embodiment, to any medium that participates in providing instructions to processor 904 for execution. Such a medium can take many forms, including but not limited to, non-volatile media, volatile media, and transmission media. Non-volatile media includes, for example, optical or magnetic disks, such as disk drive 910. Volatile media includes dynamic memory, such as system memory 906. Transmission media includes coaxial cables, copper wire, and fiber optics, including wires that comprise bus 902. Transmission media can also take the form of electromagnetic, acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, time-dependent waveforms, or any other medium from which a computer can read instructions.

In some examples, execution of the sequences of instructions can be performed by a single computer system 900. According to some examples, two or more computer systems 900 coupled by communication link 920 (e.g., links to LAN, PSTN, or wireless network) can perform the sequence of instructions in coordination with one another. Computer system 900 can transmit and receive messages, data, and instructions, including program code (i.e., application code) through communication link 920 and communication interface 912. Received program code can be executed by processor 904 as it is received, and/or stored in disk drive 910, or other non-volatile storage for later execution. In one embodiment, system 900 (or a portion thereof) can be integrated into an image capture device or a display device for matching colors using light source detection.

Figure 10A:
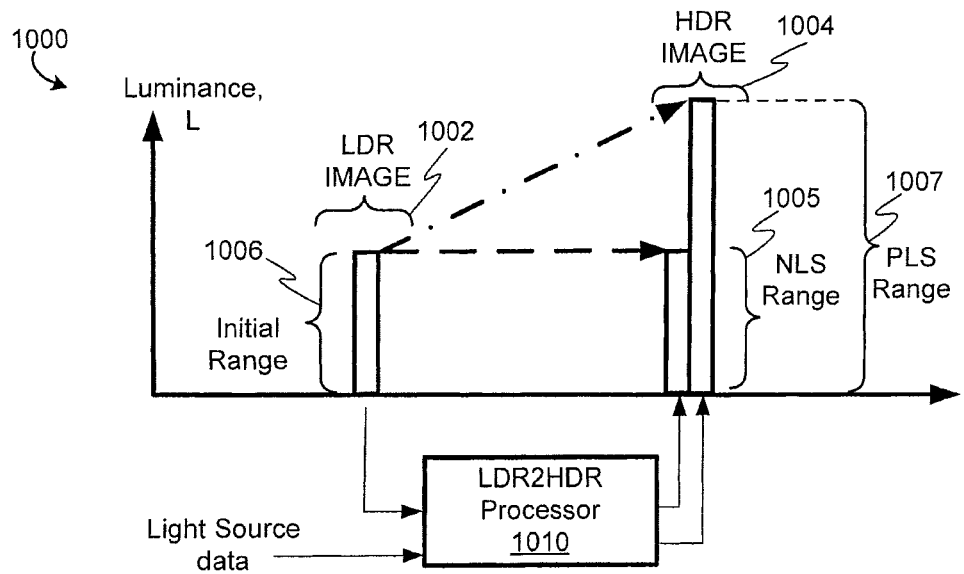
FIGS. 10A and 10B depict examples of a luminance range modification apparatus, according to an embodiment of the invention.
Figure 10B:
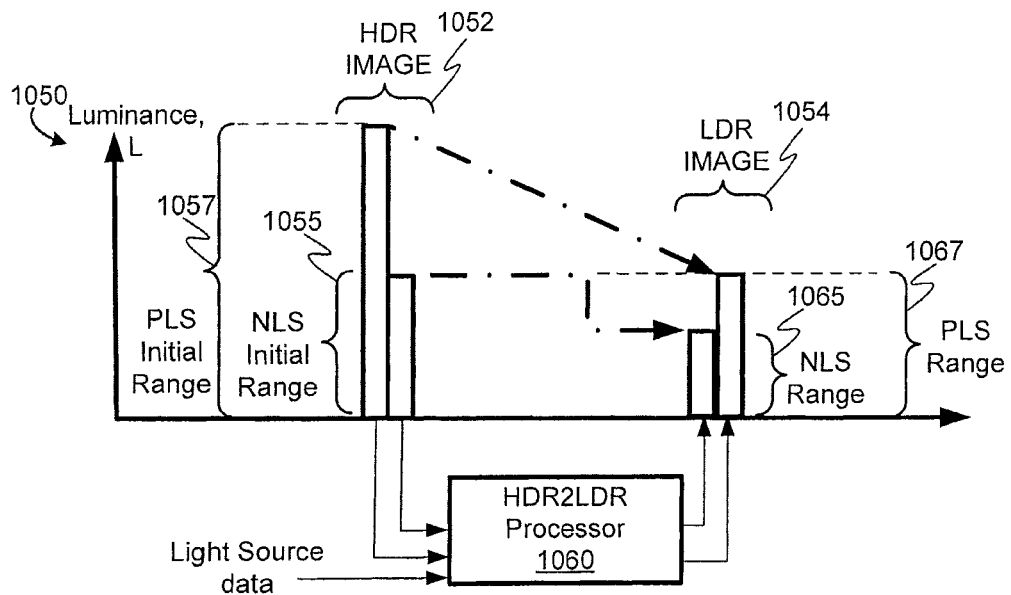

FIGS. 10A and 10B depict examples of a luminance range modification apparatus, according to an embodiment of the invention. Diagram 1000 depicts an LDR2HDR processor 1010 configured to convert a low dynamic range of luminance values of an LDR image 1002 to a high dynamic range of luminance values of an HDR image 1004. In particular, LDR2HDR processor 1010 is configured to receive light source data specifying pixels associated with a light source (e.g., a perceived light source, such as a physical light source or a specular reflection) and convert luminance range 1006 associated with the light source to another luminance range 1007 as a perceived light source ("PLS") range. Further, LDR2HDR processor 1010 is configured to receive light source data specifying pixels that are not associated with a light source (e.g., a non-light source, such as a diffuse reflection), and maintain luminance range 1006 associated with the non-light source luminance range 1005 as a non-light source ("NLS") range for the HDR image 1004, or establish luminance range 1005 at any range that has fewer values of luminance than range 1007. Diagram 1050 depicts an HDR2LDR processor 1060 configured to convert a high dynamic range of luminance values of an HDR image 1052 to a low dynamic range of luminance values for an LDR image 1054. In particular, HDR2LDR processor 1060 is configured to receive light source data specifying pixels associated with a light source (e.g., a perceived light source) and convert luminance range 1057 associated with a light source to another luminance range 1067 as a perceived light source ("PLS") range. Further, HDR2LDR processor 1010 is configured to receive light source data specifying pixels that are associated with a non-light source and to maintain or, in some embodiments, reduce the initial non-light source ("NLS") range 1055 for the HDR image 1052 to NLS range 1065. Therefore, light sources in LDR image 1054 can have luminance values that extend over the ability of, for example, an LDR display to display light sources brighter than non-light sources. These values can, in some embodiments, be clipped to create a more pleasing image rendition.

Figure 11:
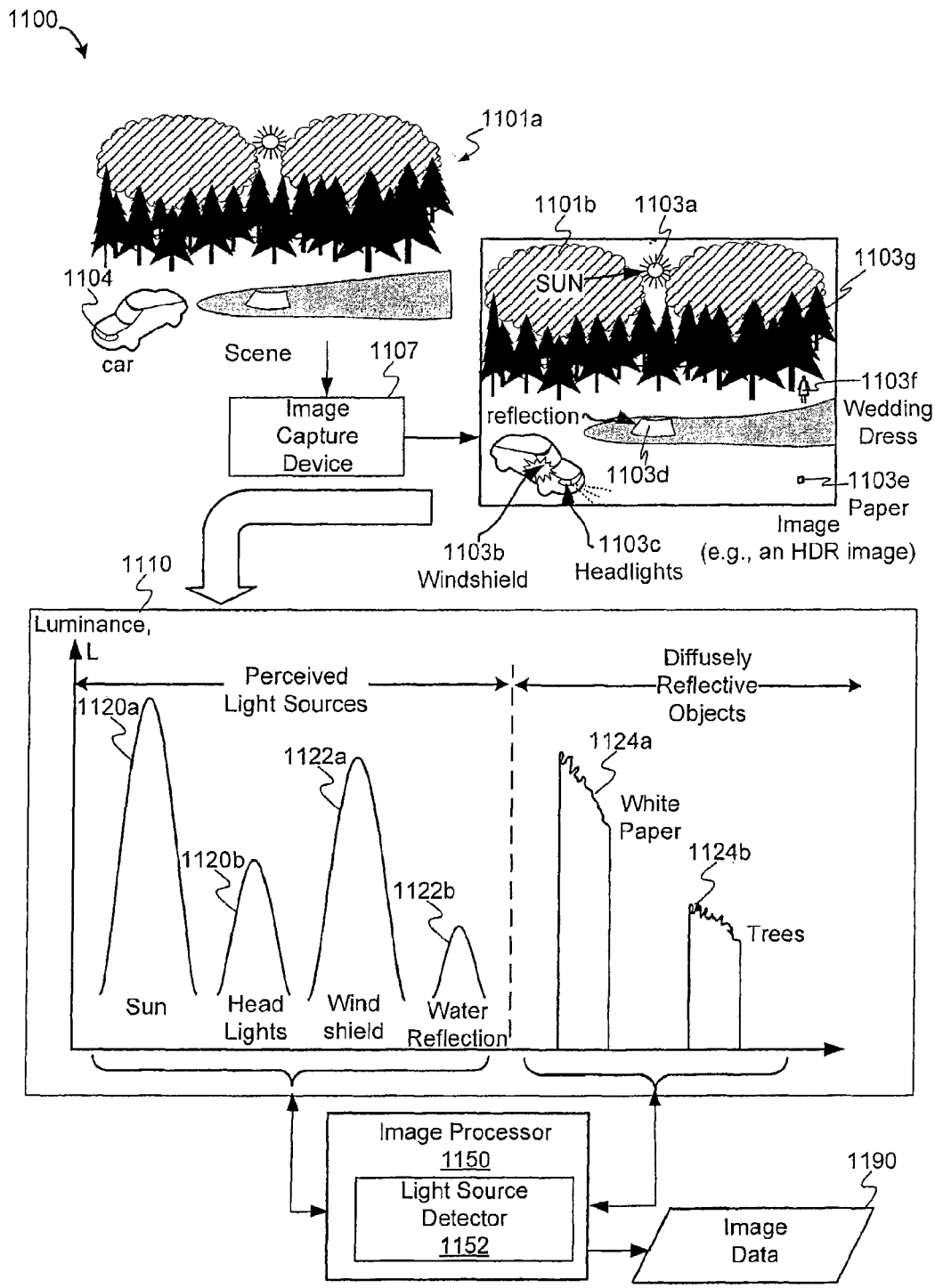
FIG. 11 depicts a light source detector configured to detect light sources as perceived light source, according to embodiments of the invention.

FIG. 11 depicts a light source detector configured to detect light sources as perceived light source, according to embodiments of the invention. Diagram 110 depicts a scene 1101a similar to that shown in FIG. 1A, but includes a car 1004 having a windshield 1103b and headlights 1103a, both of which may be perceived as light sources. For example, consider that image capture device 1107, such as a camera, that is configured to capture the imagery of a scene 1101a to produce an image 1101b, which may be either an HDR image or an LDR image. Image 1101b includes sun 1103a as a bright, physical light source, headlights 1103c as dim, physical light sources, a windshield 1103b producing a bright, specular reflection as a perceived light source, a dark water reflection 1103d as a dim, specular reflection, a piece of white paper 1103e and a wedding dress 1103f as bright, diffusely reflective objects, and trees 1103g (and other elements of the image) that are dim, diffusely reflective objects. Relative luminance values (or luminance profiles that are not to scale) for the above-mentioned objects are depicted as values 1110 in which luminance values 1120a (i.e., the sun), 1120b (i.e., headlights), 1122a, (i.e., the windshield), and 1122b (i.e., a water reflection) can be perceived as light sources (including associated glare) in image 1101b, whereas non-light sources, such as the diffusely reflective objects, have luminance values depicted as 1124a (i.e., paper) and 1124b (i.e., trees). Diffusely reflective objects may be darker and/or have surfaces that scatter light more than specularly reflective objects. Diffusely reflective objects are therefore typically rougher than specularly reflective objects, which are typically smoother. In some cases, reflections off an object can contain both specular and diffuse components. The roughness inherent in diffusively reflective objects is depicted as the jagged features and the relatively clear edge (e.g., "edginess"). As diffusively reflective objects reflect relatively less light than light sources and specularly reflective objects, they can induce relatively less glare in an imaging device or the human visual system. Therefore, a cross-section of their luminance image can have relatively sharp edges.

Figure 12:
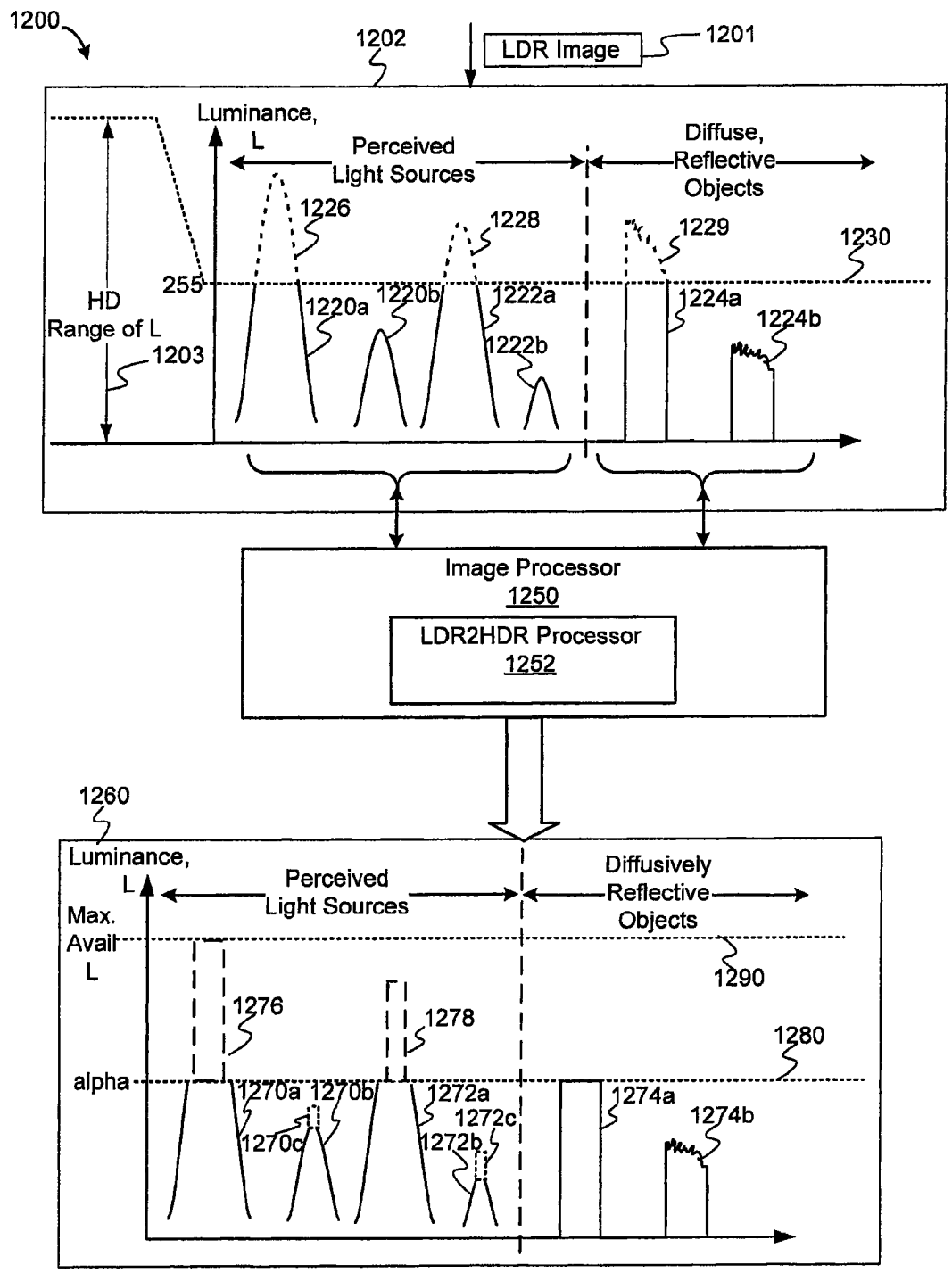
FIG. 12 depicts an image processor configured to boost luminance values for perceived light sources, according to embodiments of the invention.

Image processor 1150 can be configured to process image 1101b as either an HDR or an LDR image to produce image data 1190 that can be used to reproduce the image in a target environment using a display or projection device that has specific operating characteristics, including a specific range of luminance with which to generate the reproduced image. Light source detector 1152 is configured to detect objects 1103a, 1103b, 1103c, and 1103d as perceived light sources and to generate light source identification data as part of image data 1190, which can be provided to a luminance modifier, such as LDR2HDR processor 1010 (FIG. 10A) and HDR2LDR processor 1060 (FIG. 10B). To illustrate operation of LDR2HDR processor 1010 (FIG. 10A), consider that image processor 1150 operates to generate image data 1190 that represents an LDR image. In some cases, the LDR image is generated for reproduction with display technologies that have relatively limited dynamic range and limited luminance values. Thus, HDR image content (e.g., real world content as perceived by the HVS) is compressed to a range that a display can handle. Therefore, image processor 1150 may compress the luminance values 1120a, 1122a, and 1124a associated with respective objects 1103a, 1103c, and 1103e and encode the values at similar luminance levels as shown in FIG. 12. Note that the encoding of the image data for luminance values 1120a and 1122a may have glare encoded in the compressed image (i.e., the LDR image), whereas the luminance value 1124a may not have glare associated with it.

FIG. 12 depicts an image processor configured to boost luminance values for perceived light sources, according to embodiments of the invention. Diagram 1200 depicts an image processor 1250 including an LDR2HDR processor 1252 that is configured to convert a low dynamic range of luminance values of an LDR image 1201 to a high dynamic range of luminance values associated with luminance values 1260. In this example, LDR image 1201 is an image of scene 1101a of FIG. 11. Therefore, luminance values 1220a, 1220b, 1222a, 1222b, 1224a and 1224b relate to luminance values 1120a, 1120b, 1122a, 1122b, 1124a and 1124b of the real-world content (i.e., luminance ranges perceptible by the HVS) or an HDR image. In this example, an image capturing device limited to low dynamic ranges reduces the range of luminance available in the scene from range 1203 to a range between 0 and line 1230, which coincides with an encoding bit-level is 255 (e.g., for an 8-bit encoding), as an example. As shown, the brightest content in LDR image 1201 is clipped (or "maxed out"). In particular, luminance values 1120a, 1122a, and 1124a are clipped by removing portions 1226, 1228, and 1229, respectively, thereby setting them to the same value in the depiction of values 1220a, 1222a, and 1224a. Thus, perceived light sources and non-light sources can both be clipped. Such content may be clipped due to the limited capabilities of LDR cameras, the desire to capture content (e.g., by a photographer) in manner that maximizes the signal-to-noise ratio of the image, or as a result of modifications by a color-timer.

In some embodiments, LDR2HDR processor 1252 is configured to address quantization and discretization when mapping image data (e.g., luminance values) in LDR image 1201 to generate an HDR image, whereby non-light sources in the HDR image, when displayed at the higher levels of luminance, may be associated with an amount of glare or otherwise may be perceived as appearing to be self-luminous (i.e., glow) in the imaging device or the human visual system. Therefore, the piece of white paper 1103 or the wedding dress 1103f may appear to glow after LDR image 1201 is converted into an HDR image or is displayed on an HDR display. Note that LDR image 1201 includes data representing relative luminance information, and, as such, an object can be encoded to a different gray-level in two different images, or two differently bright objects can be encoded to the same gray-level in two different images (e.g. the sun 1103a of FIG. 11 originally at 100,000 cd/m2 and paper 1103e originally at 1,000 cd/m2 can be encoded to the same relative luminance values). In some cases, a bright, diffusively reflective object, such as paper 1103e, can be encoded without clipping, and may appear to glow after the conversion from the LDR to the HDR, because it gets display at too high of a luminance level in the HDR display device.

LDR2HDR processor 1252 is configured to boost luminance values associated with the perceived light source, while reducing or otherwise leaving luminance values of diffusively reflective objects at luminance values associated with LDR image 1201. In diagram 1200, LDR2HDR processor 1252 is configured to boost values 1220a and 1222a by amounts 1276 and 1278, respectively, to form modified luminance values 1270a and 1272a. In some embodiments, LDR2HDR processor 1252 can be configured to also boost unclipped light sources, such as boosting luminance values 1220b and 1222b to form modified luminance values 1270b and 1272b, which are enhanced by amounts 1270c and 1272c, respectively. In some embodiments, LDR2HDR processor 1252 can be configured to apply an inverse tone-mapping operation on data representing light sources and non-light sources, thereby mapping the luminance values from the LDR range to some fraction, alpha 1280, of an available dynamic range and luminance levels of an HDR display or projection device. The diffusively reflective objects are then mapped to within a range bounded by alpha 1280, whereas the regions of LDR image 1201 including a perceived light-source receives a luminance boost into the high dynamic range. In some embodiments, the amounts of boost 1276, 1278, 1270c and 1272c can vary, for example, as a function of the average luminance of the image (e.g., mean of the log of the luminance values exponentiated). Thus, the amounts of boost can differ from lighter backgrounds to darker background in an image. For example, more luminance boosting may be associated with a bright object in a dark background (e.g., faraway headlights at dusk) than a bright object in a light background (e.g., faraway headlights at noon, with full sun).

Figure 13:
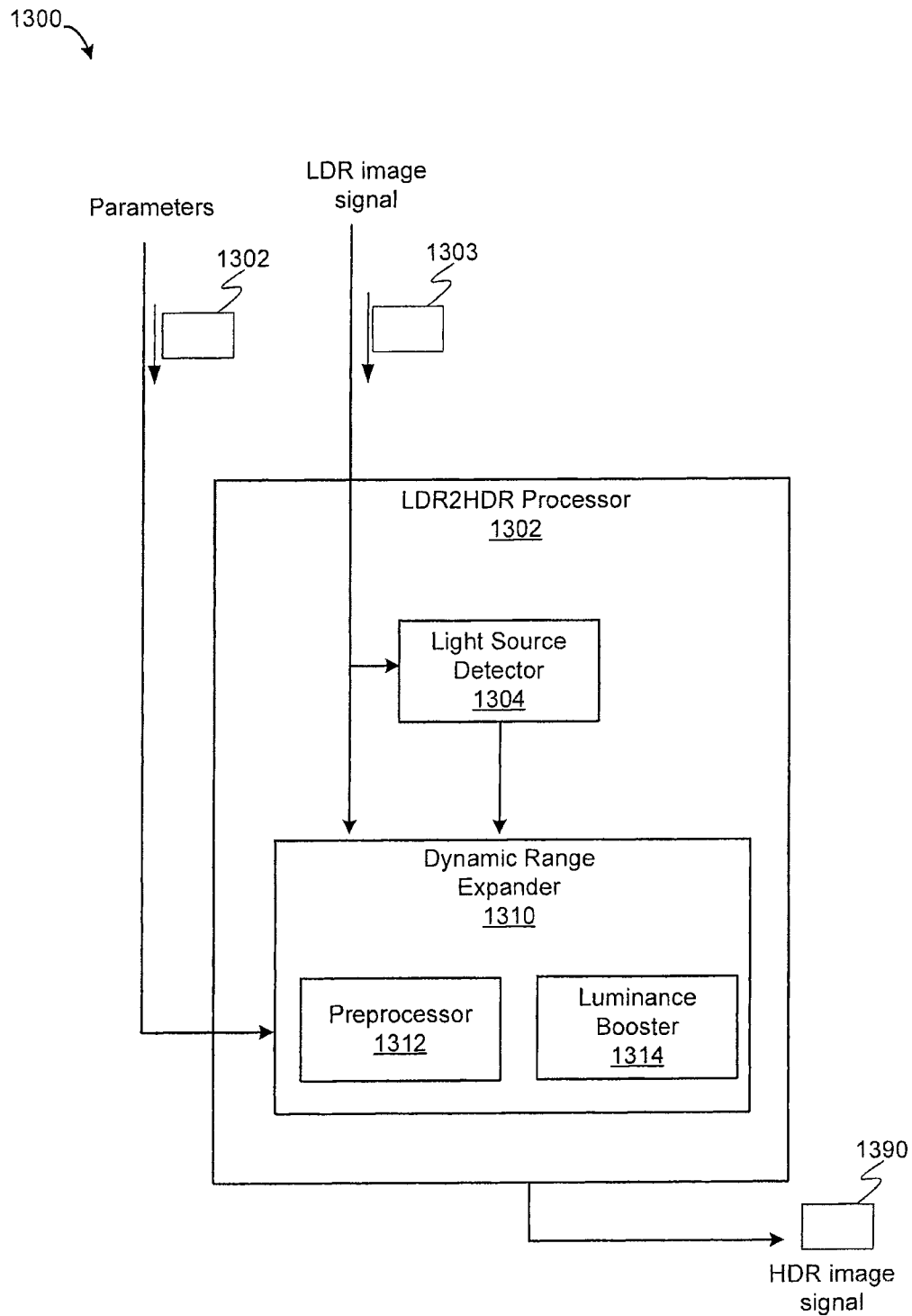
FIG. 13 depicts an LDR2HDR processor configured to boost luminance values for perceived light sources, according to embodiments of the invention.

FIG. 13 depicts an LDR2HDR processor configured to boost luminance values for perceived light sources, according to embodiments of the invention. As shown, LDR2HDR processor 1302 includes a light source detector 1304 and a dynamic range expander 1310, and is configured to receive parameters 1302, which may be optional, and LDR data 1303 representing an LDR image. Parameters 1302 include parameters that may describe the luminance range capabilities of the device displaying or capturing the data representing the LDR image 1303. LDR2HDR processor 1302 can use parameters 1302 in the expansion of the luminance ranges from LDR to HDR associated with the generated HDR image 1390. LDR2HDR processor 1302 can be configured to perform luminance range modification in association with the luminance channel (e.g., using a brightness map determined by a weighted average of red, green and blue pixel information) for the LDR image. For example, the LDR image can be encoded in sRGB format, which is used to display images on CRTs, LCDs, or other low-brightness display technologies. In particular, LDR2HDR processor 1302 can convert the image into xyY space, with a predominant amount of color information being described by x and y channels and the luminance information being described by the Y channel.

Light source detector 1304 is configured to detect light sources (e.g., objects that are perceived as light sources) in accordance with any of the techniques for detecting perceived light sources described above and/or below. In some embodiments, light source detector 1304 can detect light sources based on the values of Y channel of individual pixels. In some cases, light source detector 1304 can detect light sources based on the maximum luminance of either the R-, the G-, or the B-channels for individual pixels, or any other way to express the luminance of a pixel. Thus, light source detector 1304 can detect red and blue light-sources as well as green ones, due to, for example, the non-uniform weighting of the R, G and B channels when transforming the input RGB data to xyY. In at least one embodiment, light source detector 1304 generates a light source detection ("LSD") map that includes values representing whether a pixel is associated with a light source.

Dynamic range expander 1310 includes a preprocessor 1312 and a luminance booster 1314. Preprocessor 1312 can be configured to perform a tone mapping operation. Preprocessor 1312 can be further configured to scale or map luminance values of the image to some fraction (i.e., "alpha"). The fraction may provide scaling to accommodate an available dynamic range and luminance levels of an HDR display or projection device. The luminance values of the LSD map are multiplied by alpha. In some embodiments, the value of alpha is between 0.1 or 0.5. Luminance booster 1310 is configured to boost luminance values of pixels associated with light sources. In some embodiments, luminance booster 1310 can apply a multiplicative factor to enhance or reduce an amount of boost as a function of the lightness or darkness of the background in the image. For example, luminance booster 1310 can implement a mean luminance (e.g., a geometric mean) of the image to vary the amount of boost. In some embodiments, the multiplicative factor is (1-mean luminance). The geometric mean may be used rather than an arithmetic mean as it is less sensitive to, for example, noisy pixels. In some embodiments, luminance booster 1310 generates a "boost map" as an arrangement of data specifying an amount of boost for applicable pixels. A boost-map can be formed using equation 6.

$$\text{Boost-map} = \text{alpha} + (1-\text{alpha})*(1-\text{mean luminance})*\text{LSD-map} \quad (6)$$

where (1-mean luminance) is the aforementioned multiplicative factor and LSD-map includes data representing whether a pixel is associated with a light source. The boost map is contained within boundaries [0,1]. Next, luminance booster 1310 multiplies luminance values Y for each pixel of the image. To generate HDR image data 1390, LDR2HDR processor 1302 transforms the boosted luminance values of Y into the RGB color space along with the x- and y-channels, thereby boosting luminance without substantially affecting color in the original image.

Figure 14:
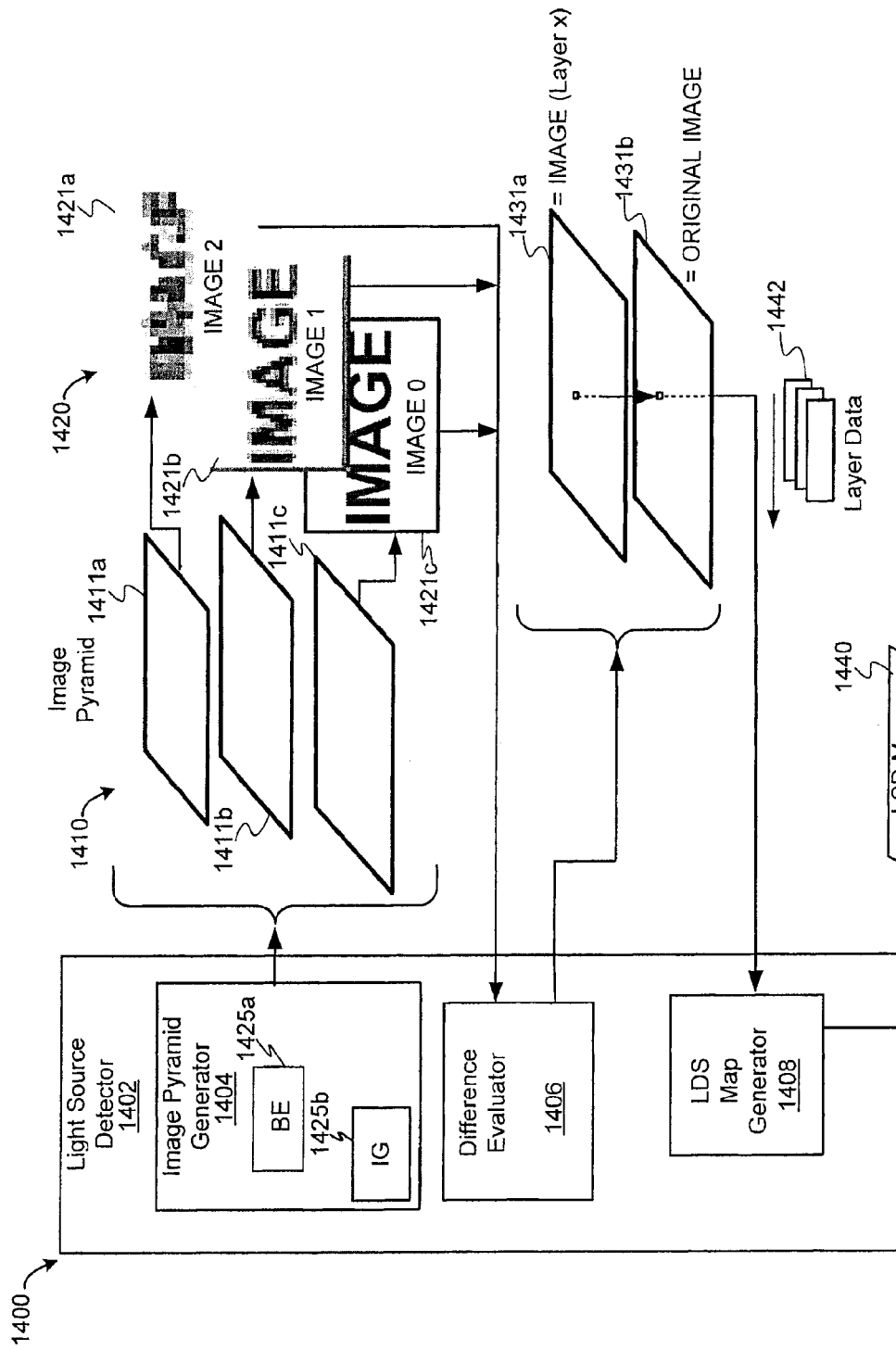
FIG. 14 depicts an example of a light source detector, according to some embodiments of the invention.

FIG. 14 depicts an example of a light source detector, according to some embodiments of the invention. Diagram 1400 depicts a light source detector 1402 that includes an image pyramid generator 1404, a difference evaluator 1406, and an LDS map generator 1408. Light source detector 1402 is configured to determine the luminance channel of an image (e.g., the luminance values derived from pixel data), and analyze whether the groups of luminance values for the pixels are associated with either a light source or a non-light source. In the example shown, image pyramid generator 1404 is configured to generate multiple versions of an image in an image pyramid 1410, whereby the multiple versions are downsampled images of the image. Image pyramid 1410 is depicted as pyramid 1420 as having progressively blurred images. Light source detector 1402 includes a background evaluator ("BE") 1425a and an iteration generator ("IG") 1425b. Background evaluator 1425a characterizes the background to guide the number of iteration or pyramid layers 1410 to be produced. For example, background evaluator 1425a can determine the mean luminance of an image. Iteration generator 1425b determines a number of pyramid layers 1410 to generate as a function of the mean luminance. In some embodiments, more iterations or pyramid layers are produced for relatively darker backgrounds, whereas fewer iterations or pyramid layers are produced for relatively lighter backgrounds.

Image pyramid generator 1404 blurs the multiple images and downsamples the blurred images progressively as the number of pixels in the downsampled images decreases. As shown, image pyramid generator 1404 generates a downsampled image 1411b of image 1411c, and to generate a second downsampled image 1411a based on first downsampled image 1411b. Image 1411c is the initial image ("Image 0") 1421c prior to downsampling and blurring operations. In some embodiments, image pyramid generator 1404 operates to downsample image 1411a to form additional downsampled images (not shown) until a number of layers are generated, as determined by iteration generator 1425b. In some embodiments, downsampled image 1411b includes half the number of pixels as image 1411c, and downsampled image 1411a includes half the number of pixels as image 1411b. Note that the downsampling can be by any amount of pixels and is not limited to half the number of pixels. Upsampled images 1421a and 1421b using, for example, bilateral interpolation, to scale downsampled images 1411a and 1411b, respectively, up to the initial resolution. Difference evaluator 1406 is configured to determine the difference between the final pyramid layer 1431a generated and the original image layer 1431b. The layer data 1442 representing the differences is used by LSD map generator 1408 to generate LSD map data 1440, whereby the LSD map data 1440 indicates whether a pixel is associated with a light source or a non-light source.

Figure 15:
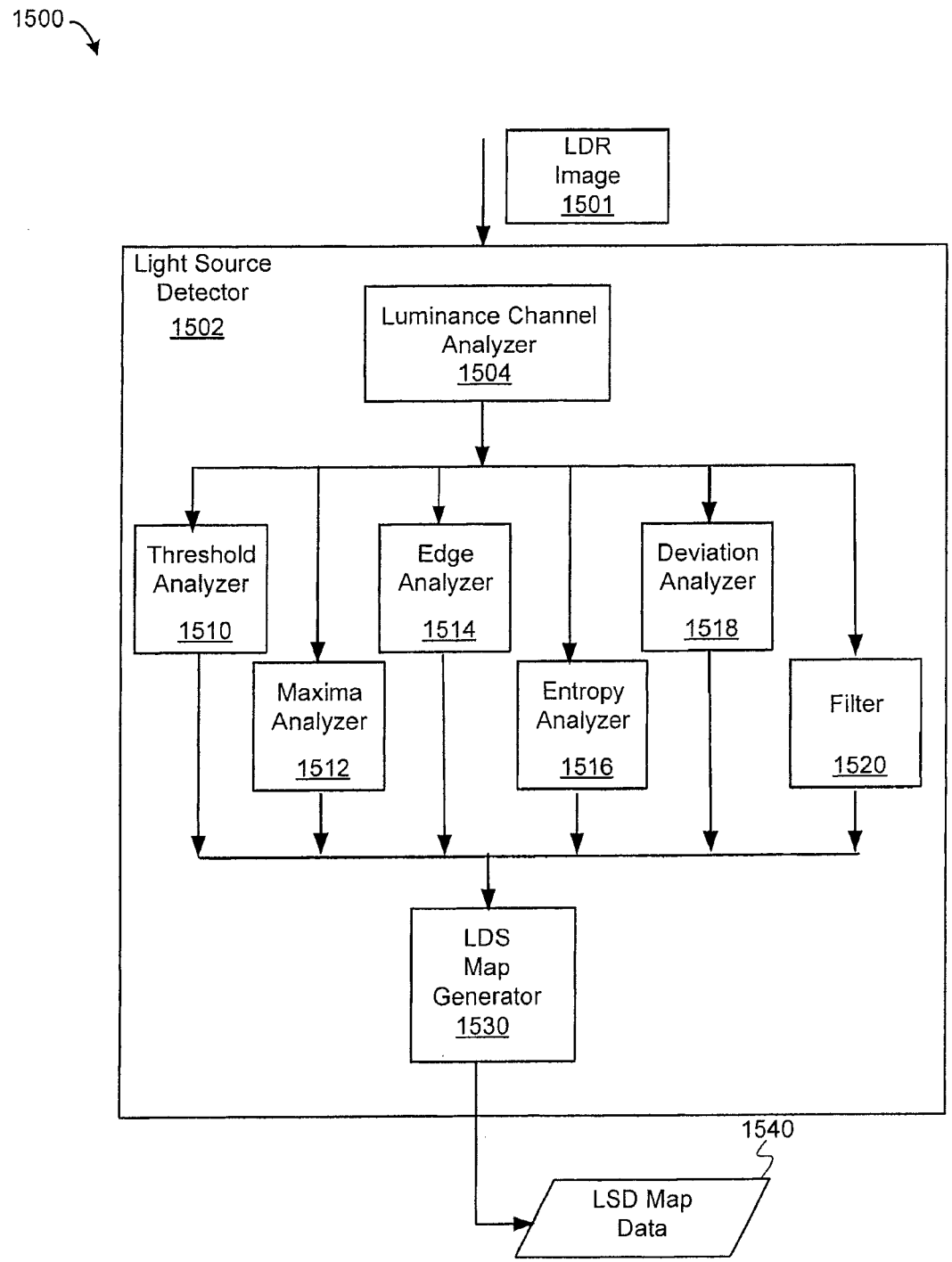
FIG. 15 depicts another example of a light source detector, according to some embodiments of the invention.

FIG. 15 depicts another example of a light source detector, according to some embodiments of the invention. Diagram 1500 depicts a light source detector 1502 that includes any number of operators to determine LSD map data 1540 for an LDR image 1501. Light source detector 1502 includes a luminance channel analyzer 1504 to determine luminance values based on a Y channel of individual pixels, or the maximum luminance of either the R-, the G-, or the B-channels, as described above in FIG. 13. Threshold analyzer 1510 is configured to implement a threshold against which to compare input data from luminance channel analyzer 1504. For example, luminance values larger than a gray-level threshold value, such as 235 out of 255, can be considered as a possible light-source. In some embodiments, threshold analyzer 1510 is configured to exclude candidates light sources that are relatively large, as they are likely non-light sources and should not have its luminance values boosted.

Maxima analyzer 1512 is configured to determine a local maximum in a map of luminance value, Y, over a group of pixels. Maxima analyzer 1512 can detect dim and bright light sources. In some embodiments, maxima analyzer 1512 implements a morphological erosion or dilation operation to remove spurious noise. Edge analyzer 1514 is configured to detect edges around bright objects, and to exclude those objects that have a relatively sharp edge (i.e., some quantifiable amount of sharpness). Non-light sources are typically associated with sharp edges. In some embodiments, glare that naturally occurs around light sources due to scattering in either the imaging device or glare that has been manually or automatically added to light sources in the image to mimic glare in the human visual system around bright objects can create a smooth, roll-off in luminance around light-sources. Entropy analyzer 1516 is configured to evaluate the entropy of the image. Entropy is a measure of disorder. As light sources tend to be ordered, they have relatively low entropy. Deviation analyzer 1518 is configured to evaluate the standard deviation of relatively small regions around each pixel as light-sources tend to have relatively small standard deviation around them compared to other regions including non-light sources. Filter 1520 is configured to operate as unsharp-filter that can return a high value around light-sources.

LDS map generator 1530 can implement one or more of the above-described operators for sets of one or more pixels to identify light sources in an image. For example, LDS map generator 1530 can implement threshold analyzer 1510 and entropy analyzer 1516 to determine bright regions with low entropy and to indicate those regions as possible candidates as light sources. As another example, LDS map generator 1530 can implement threshold analyzer 1510 and maxima analyzer

1512. LDS map generator 1530 generates LSD map data 1540 for use by, for example, a dynamic range expander (FIG. 13).

Figure 16:
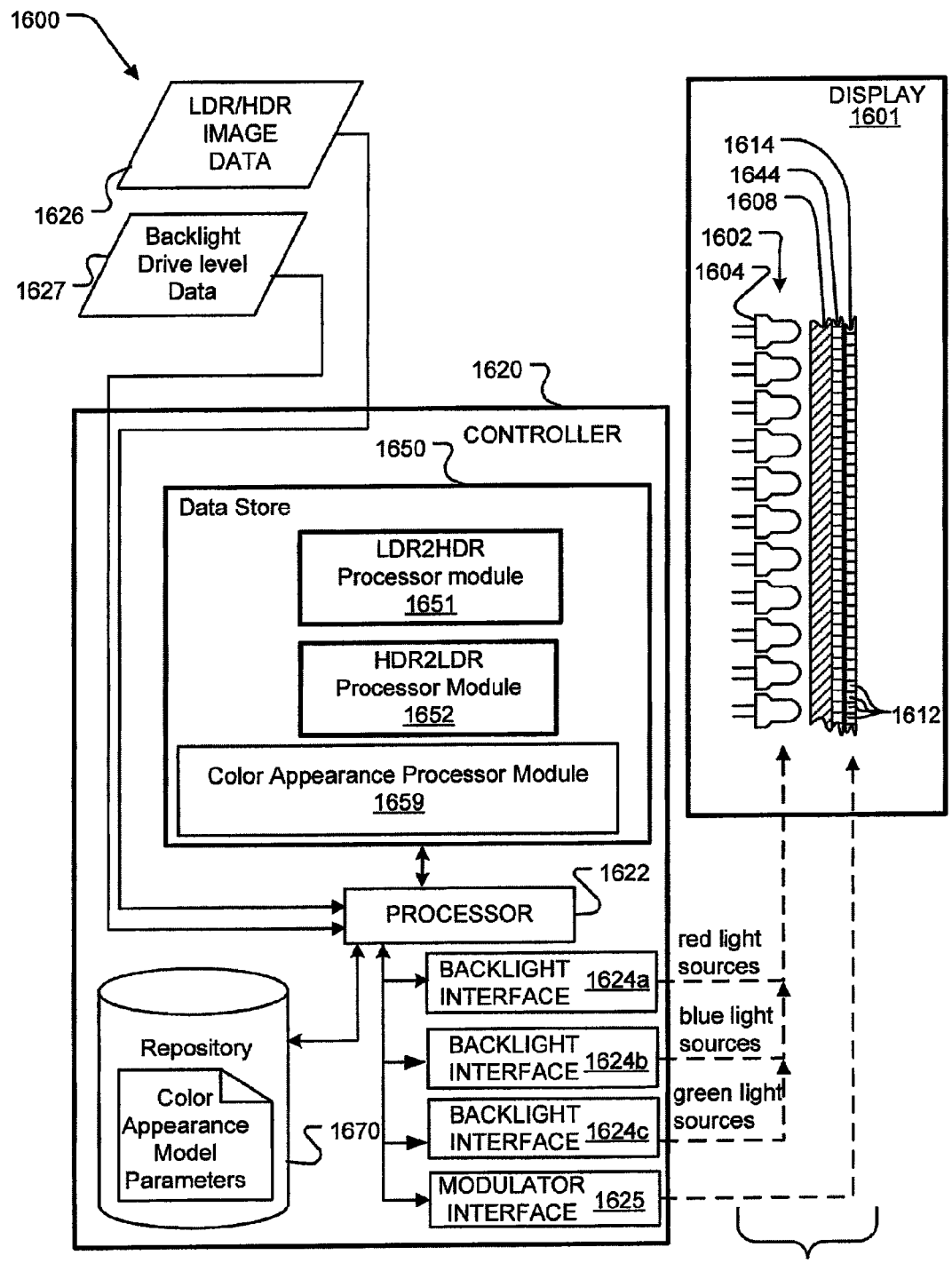
FIG. 16 is a schematic diagram of a controller configured to operate a display device having at least a front modulator, according to at least some embodiments of the invention.

FIG. 16 is a schematic diagram of a controller configured to operate a display device having at least a front modulator, according to at least some embodiments of the invention. System 1600 includes a controller 1620 configured to be coupled to a display device 1690. Controller 1620 can include a processor 1622, a data store 1650, a repository 1670, and one or more backlight interface ("backlight interface") 1624A configured to control a rear modulator, such as a backlight unit and its light sources, and an interface ("modulator interface") 1624B configured to control a front modulator. Backlight interfaces 1624*a*, 1624*b*, and 1625*c* are respectively configured to drive modulating elements 1604, which can include an array of red light sources, an array of green light sources, and an array of blue light sources. Or, modulating elements 1604 can include white light sources or any other color or combination of colors (i.e. RGGB, RGBW) as light sources. According to at least some embodiments, controller 1620 can be implemented in software, hardware, firmware, circuitry, or a combination thereof. Data store 1650 can include one or more of the following modules: an LDR2HDR processor 1651, an HDR2LDR processor 1652, and color appearance processor module 1659 to implement color appearance models. Each of these modules can include executable instructions for performing the functionalities described herein. Repository 1670 can be configured to store data structures including data representing color appearance model data, including any parameter, as described herein. According to at least some embodiments, controller 1620 can be implemented as hardware modules, such as in programmable logic, including an FPGA or equivalent, or as part of an ASIC. Further, one or more of the following modules can be implemented as firmware: LDR2HDR processor module 1651, HDR2LDR processor module 1652, and color appearance processor module 1659. In some embodiments, repository 1670 can be implemented in programmable logic, including an FPGA.

Display device 1690 can include a front modulator 1614, a rear modulator 1602, and optical structures 1644 and 1608 being configured to carry light from rear modulator 1602 to front modulator 1614. Front modulator 1614 can be an optical filter of programmable transparency that adjusts the transmissivity of the intensity of light incident upon it from rear modulator 1602. Rear modulator 1602 can be configured to include one or more light sources. In some examples, rear modulator 1602 can be formed from one or more modulating elements 1604, such as one or more arrays of LEDs. The term rear modulator, as used herein in some embodiments, can refer to backlight, a backlight unit and modulated light sources, such as LEDs. In some examples, the rear modulator can include, but is not limited to a backlight having an array of controllable LEDs or organic LEDs ("OLEDs"). In some examples, front modulator 1614 may comprise an LCD panel or other transmission-type light modulator having pixels 1612. Front modulator 1614 can be associated with a resolution that is higher than the resolution of rear modulator 1602. In some embodiments, front modulator 1614 may include, but is not limited to an LCD panel, LCD modulator, projection-type display modulators, active matrix LCD ("AM-LCD") modulators, and other devices that modulate a light and/or image signal. Optical structures 1644 and 1608 can include elements such as, but not limited to, open space, light diffusers, collimators, and the like. In some examples, front modulator 1614 and rear modulator 1602 can be configured to collectively operate display device 1690 as an HDR display, or in some embodiments, as an LDR display. Thus, display 1601 can be either an HDR display for use with LDR2HDR processor module 1651 or an LDR display for use with HDR2LDR processor module 1652.

In some embodiments, controller 1620 can be configured to provide front modulator drive signals, based upon input image 1626 and backlight drive level data 1627, to control the modulation of transmissivity associated with LCD pixels 1612 of front modulator 1614, thereby collectively presenting a desired image on display device 1690. Although not shown, controller 1620 may be coupled to a suitably programmed computer having software and/or hardware interfaces for controlling rear modulator 1602 and front modulator 1614 to display an image specified by data corresponding to input image 1626. It may be appreciated that any of the elements described in FIG. 16 can be implemented in hardware, software, or a combination of these. In some embodiments, controller 1620 can be implemented in projection-based image rendering devices and the like.

The above-described methods, techniques, processes, apparatuses and computer-medium products and systems may be implemented in a variety of applications, including, but not limited to, HDR projection devices and displays, LDR projection devices and displays, displays of portable computers, digital clocks, watches, appliances, electronic devices, audio-visual devices, medical imaging systems, graphic arts, televisions, projection-type devices, and the like.

In some examples, the methods, techniques and processes described herein may be performed and/or executed by executable instructions on computer processors, for which such methods, techniques and processes may be performed. For example, one or more processors in a computer or other display controller may implement the methods describe herein by executing software instructions in a program memory accessible to a processor. Additionally, the methods, techniques and processes described herein may be implemented using a graphics processing unit ("GPU") or a control computer, or field-programmable gate array ("FPGA") or other integrated circuits coupled to the display. These methods, techniques and processes may also be provided in the form of a program product, which may comprise any medium which carries a set of computer-readable instructions which, when executed by a data processor, cause the data processor to execute such methods, techniques and/or processes. Program products, may include, but are not limited to: physical media such as magnetic data storage media, including floppy diskettes, and hard disk drives; optical data storage media including CD ROMs, and DVDs; electronic data storage media, including ROMs, flash RAM, non-volatile memories, thumb-drives, or the like; and transmission-type media, such as digital or analog communication links, virtual memory, hosted storage over a network or global computer network, and networked-servers.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and can be distributed spatially. As software, the above-described techniques may be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, Ruby on Rails, and others. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. These can be varied and are not limited to the examples or descriptions provided.

Accordingly, the invention may be embodied in any of the forms described herein, including, but not limited to the following Enumerated Example Embodiments (EEEs) which describe structure, features, and functionality of some portions of the present invention:

EEE1

A method generating images, the method comprising:
detecting subsets of pixels representing image portions for an image, the subsets of pixels being associated with data representing luminance values indicative of candidate light sources;
specifying that a first subset of pixels for a first image portion is associated with a first light source; and determining a parameter for the first subset of pixels, the parameter being configured to generate a color in a reproduced image that includes the first image portion.

EEE2

The method of EEE1 further comprising:
generating the reproduced image on a display.

EEE3

The method of EEE1 wherein specifying that the first subset of pixels is associated with the first light source comprises:
identifying the first subset of pixels as the first light source as a function of a quantity of pixels and luminance values relative to a second subset of pixels associated with a non-light source.

EEE4

The method of EEE1 further comprising:
determining that a second subset of pixels for a second image portion is associated with a non-light source.

EEE5

The method of EEE4 further comprising:
detecting that a first area associated with the first subset of pixels is less than a first area threshold indicative of being perceived as self-luminous; and
detecting that a second area associated with the second subset of pixels is greater than a second area threshold indicative of a reflective surface.

EEE6

The method of EEE1 further comprising:
determining that a second subset of pixels for a second image portion is associated with a non-light source; and
calculating data representing a white point for the image based on the light source.

EEE7

The method of EEE1 wherein determining the parameter for the first subset of pixels comprises:
calculating a degree of adaptation, D, for the first subset of pixels constituting the first light source indicates that does not discount for an illuminant color of the first light source.

EEE8

The method of EEE1 further comprising:
determining that a second subset of pixels for a second image portion is associated with a non-light source; and
determining the parameter for the second subset of pixels.

EEE9

The method of EEE8 wherein determining the parameter for the second subset of pixels comprises:
calculating a degree of adaptation, D, for the second subset of pixels constituting the non-light source that discounts an illuminant color of the first light source.

EEE10

The method of EEE1 wherein detecting the subsets of pixels representing the image portions for the image, comprises:
generating downsampled images of the image that are blurred progressively as the number of pixels in the downsampled images decreases;
determining differences between sets of values from the image and the downsampled images to form resultant images; and
determining the candidate light sources as a function of a number of the resultant images that include the sets of luminance values.

EEE11

The method of EEE1 wherein detecting the subsets of pixels representing the image portions for the image, comprises:
determining a first set of values representative of changes in luminance values that indicate a boundary for a first group of pixels in the image;
distributing the first set of values representative of the changes in the luminance values over neighboring pixels to form distributed values representative of the changes in the luminance values in another image;
downsampling the another image to form a second set of values representative of changes in luminance values that indicate another boundary for a second group of pixels in a downsampled image of the another image; and
subtracting the second set of values by the first set of values to define the candidate light sources.

EEE12

The method of EEE11 wherein distributing the first set of values comprises:
performing a Gaussian blur operation to blur the first set of values.

EEE13

The method of EEE1 further comprising:
analyzing characteristics of a candidate light source; and
determining that a candidate light source is not a light source and is associated with pixels having the highest luminance brightest element in the scene.

EEE14

The method of EEE1 further comprising:
determining that a second subset of pixels for a second image portion is associated with a non-light source.

EEE 15

The method of EEE13 further comprising:
scaling a range of luminance values to be generated by the first subset of pixels to a first range; and
scaling a range of luminance values to be generated by the second subset of pixels to a second range, the second range including less luminance values than the first range,
wherein the image is associated with a low dynamic range ("LDR") of luminance values and the reproduced image is associated with a high dynamic range ("HDR") of luminance values.

EEE 16

The method of EEE1 further comprising:
determining a pixel in the image that is not associated with the light source, the pixel having a luminance value greater than other pixels for non-light sources; and
selecting the luminance value for the pixel as a value of an adapting luminance, $L_A$, for the image,
wherein the adapting luminance is a global parameter.

EEE17

The method of EEE1 further comprising:
determining a subset of pixels in the image that is associated with the non-light source, the subset of pixels being associated with a luminance value greater than other pixels for the non-light source; and
selecting the luminance value for the pixel as a value of an adapting luminance, $L_A$, for a region of the image,
wherein the adapting luminance is a local parameter for the region.

EEE18

An apparatus for processing images comprising:
a light source analyzer configured to analyze pixel values of an image to identify a set of candidate light sources, the light source analyzer comprising:
  a candidate light source detector configured to detect data representing boundaries for the areas associated with frameworks as the candidate light sources; and
  a light source identifier configured to identify data representing a subset of the candidate light sources as perceived light sources; and
an environmental parameter generator configured to determine a parameter for each pixel of the light sources to generate a color in a reproduced image at a device at a target environment,
wherein the color is influenced by an illuminant color of at least one of the light sources.

EEE19

The apparatus of EEE18 further comprising:
a degree-of-adaptation generator configured to determine a degree of adaptation, D, for each pixel.

EEE20

The apparatus of EEE19 wherein the degree-of-adaptation generator is configured to set the degree of adaptation, D, for pixels associated with a perceived light source to zero or any value lower than is applied to non-light sources.

EEE21

The apparatus of EEE20 wherein the light source identifier is configured further to identify a non-light source from the candidate light sources.

EEE22

The apparatus of EEE21 further comprising:
an adapting luminance generator configured to determine an adapting luminance, $L_A$, as a function of a luminance value of a pixel in the non-light source.

EEE23

The apparatus of EEE18 further comprising:
an image pyramid generator configured to generate data representing downsampled images of the image, and further configured to blur progressively the downsampled images as the number of pixels in the downsampled images decreases,
wherein the image and the downsampled images are layers of an image pyramid stored within a data structure.

EEE24

The apparatus of EEE23 further comprising:
a difference evaluator configured to determine differences between layered pixels in two of the image and the downsampled images,
wherein a positive, non-zero result associated with at least a subset of the layered pixels is indicative a boundary of at least one of the candidate light sources.

EEE25

The apparatus of EEE25 further comprising:
a framework characterizer configured to generate a characteristic for determining whether a framework is a perceived light source.

EEE26

The apparatus of EEE25 wherein the characteristic comprises:
data representing a number of the layers that include pixels associated with the framework.

EEE27

The apparatus of EEE18 wherein the candidate light source detector is further configured to determine a difference of Gaussians result image between two of the image and the downsampled images,
wherein the difference of Gaussians result image indicates boundaries of the frameworks.

EEE28

The apparatus of EEE18 wherein the light source identifier further comprises:
a size evaluator configured to determine a size of a candidate light source; and
a luminance evaluator configured to determine one or more luminance values of the candidate light source, wherein the light source identifier is configured to identify a framework as a light source based on the size being less than a size threshold and the one or more luminance values being above a luminance threshold.

EEE29

The apparatus of EEE18 wherein the environmental parameter generator further comprises:
a source environmental parameter generator configured to compute source parameters associated with a source environment associated with the image, the source parameters including a degree of adaptation, D, associated with the source environment.

EEE30

The apparatus of EEE29 wherein further comprising:
a source image generator configured to receive the source parameters to generate appearance correlates associated with a color appearance model.

EEE31

The apparatus of EEE18 wherein the environmental parameter generator further comprises:
a target environmental parameter generator configured to compute target parameters associated with a target environment associated with the reproduced image, the target parameters including a degree of adaptation, D, associated with the target environment.

EEE32

The apparatus of EEE31 wherein further comprising:
a target image generator configured to receive the target parameters and the appearance correlates to generate the reproduced image adapted to the target environment.

EEE33

A computer readable medium configured to detect light sources for reproducing color at a target environment, the computer readable medium comprising executable instructions configured to:
detect subsets of pixels representing image portions for an image, the subsets of pixels being associated with data representing luminance values indicative of candidate light sources;
specify that a first subset of pixels for a first image portion is associated with a first light source; and
determine a parameter for the first subset of pixels, the parameter being configured to generate a color in a reproduced image that includes the first image portion.

EEE34

The computer readable medium of EEE33 further comprising executable instructions configured to:
generate the reproduced image on a display.

EEE35

The computer readable medium of EEE33 wherein the executable instructions to specify that the first subset of pixels is associated with the first light source comprise executable instructions configured to:
identify the first subset of pixels as the first light source as a function of a quantity of pixels and luminance values relative to a second subset of pixels associated with a non-light source.

EEE36

The computer readable medium of EEE33 further comprising executable instructions configured to:
determine that a second subset of pixels for a second image portion is associated with a non-light source.

EEE37

The computer readable medium of EEE36 further comprising executable instructions configured to:
detect that a first area associated with the first subset of pixels is less than a first area threshold indicative of being self-luminous; and
detect that a second area associated with the second subset of pixels is greater than a second area threshold indicative of a reflective surface.

EEE38

The computer readable medium of EEE33 further comprising executable instructions configured to:
determine that a second subset of pixels for a second image portion is associated with a non-light source; and
calculate data representing a white point for the image based on the light source.

EEE39

The computer readable medium of EEE33 wherein the executable instructions configured to determine the parameter for the first subset of pixels comprises executable instructions configured to:
calculate a degree of adaptation, D, for the first subset of pixels constituting the first light source indicates that does not discount for an illuminant color of the first light source.

EEE40

The computer readable medium of EEE33 further comprising executable instructions configured to:
determine that a second subset of pixels for a second image portion is associated with a non-light source; and determine the parameter for the second subset of pixels.

EEE41

The computer readable medium of EEE40 wherein the executable instructions configured to determine the parameter for the second subset of pixels comprises executable instructions configured to:
calculate a degree of adaptation, D, for the second subset of pixels constituting the non-light source that discounts an illuminant color of the first light source.

EEE42

The computer readable medium of EEE33 wherein the executable instructions configured to detect the subsets of pixels representing the image portions for the image comprises executable instructions configured to:

generate downsampled images of the image that are blurred progressively as the number of pixels in the downsampled images decreases;

determine differences between sets of luminance values from two of the image and the downsampled images to form resultant images; and determine the candidate light sources as a function of a number of the resultant images that include the sets of luminance values.

EEE43

An apparatus for generating images comprising:
a rear modulator comprising sets of light sources, each set of light sources being configured to generate a luminance pattern having a spectral power distribution;
a front modulator comprising:
an array of modulating elements, and
an array of color elements; and
an image processor comprising:
a light source analyzer configured to detect a light source; and
an environmental parameter processor configured to determine a value for a parameter as a function of whether a pixel is associated with the light source.

EEE44

The apparatus of EEE43 wherein the environmental parameter processor further comprises.
a degree of adaptation, D, generator configured to determine a degree of adaptation for each pixel of an image.

EEE45

An apparatus for processing images comprising:
a light source analyzer configured to analyze pixel values of an image to identify a light source, the light source analyzer comprising:
a light source detector configured to identify data representing the light sources as a perceived light source; and
a luminance range modifier configured to modify the luminance range of an image for the perceived light source.

EEE46

The apparatus of EEE45 wherein the luminance range modifier comprises:
an LDR2HDR processor configured to convert a low dynamic range of luminance values to a high dynamic range of luminance values.

EEE47

The apparatus of EEE46 wherein the LDR2HDR processor is configured to boost luminance values associated with the perceived light source.

EEE48

The apparatus of EEE45 wherein the light source detector is configured to detect the perceived light source as a function of a number of layers associated with data representing an image pyramid.

EEE49

The apparatus of EEE48 wherein the number of layers is determined as a function of a mean luminance value of the image.

EEE50

The apparatus of EEE48 wherein the light source detector is further configured to detect the perceived light source by determining a difference between two layers.

EEE51

The apparatus of EEE45 wherein the luminance range modifier comprises:
a HDR2LDR processor configured to convert a high dynamic range of luminance values to a low dynamic range of luminance values.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

The invention claimed is:

1. A method for reproducing color appearance of an image from a source environment at a device at a target environment, comprising:
analyzing pixel values of the image from the source environment to identify a set of candidate light sources, wherein the analyzing of pixel values comprises detecting data representing boundaries for areas associated with frameworks as the candidate light sources;

identifying data representing a subset of the candidate light sources as perceived light sources;

determining a degree of adaptation, D, for each pixel, wherein the degree of adaptation, D, indicates whether or to what degree to discount for an illuminant color of a light source, setting the degree of adaptation, D, for pixels associated with a perceived light source to zero for no adaptation, or to any other value lower than is applied to non-light sources.

2. The method of claim 1 wherein the color of the pixels is influenced by an illuminant color of at least one of the perceived light sources.

3. The method of claim 1 wherein identifying the data representing the subset of the candidate light sources comprises:

identifying a subset of pixels as a candidate light source as a function of a quantity of pixels and luminance values relative to a subset of pixels associated with the non-light sources.

4. The method of claim 1 further comprising:
calculating data representing a white point for the image based on the perceived light sources.

5. The method of claim 1 further comprising:
setting the degree of adaptation, D, for subsets of pixels with luminance values below a luminance threshold value to a constant value, Dint, namely an intermediate degree of adaptation; and interpolating the degree of adaptation, D, for subsets of pixels above the threshold luminance value in proportion to the pixels' luminance values between that of a perceived light source and the threshold luminance value.

6. The method of claim 5 wherein the interpolating of the degree of adaptation, D, varies between zero and the intermediate degree of adaptation as a function of a Hermite polynomial.

7. The method of claim 1 wherein analyzing the pixel values of the image, comprises:

generating downsampled images of the image that are blurred progressively as the number of pixels in the downsampled images decreases;

determining differences between sets of values from the image and the downsampled images to form resultant images; and determining the candidate light sources as a function of a number of the resultant images that include the sets of luminance values.

8. The method of claim 1 wherein analyzing the pixel values of the image, comprises:

determining a first set of values representative of changes in luminance values that indicate a boundary for a first group of pixels in the image;

distributing the first set of values representative of the changes in the luminance values over neighboring pixels to form distributed values representative of the changes in the luminance values in another image;

downsampling the another image to form a second set of values representative of changes in luminance values that indicate another boundary for a second group of pixels in a downsampled image of the another image; and subtracting the second set of values by the first set of values to define the candidate light sources.

9. The method of claim 1 further comprising:
determining a pixel in the image that is not associated with the perceived light sources, the pixel having a luminance value greater than other pixels for the non-light sources; and selecting the luminance value for the pixel as a value of an adapting luminance, $L_A$, for the image,
wherein the adapting luminance is a global parameter.

10. The method of claim 1 further comprising:
determining a subset of pixels in the image that is associated with the non-light sources, the subset of pixels being associated with a luminance value greater than other pixels for the non-light sources; and selecting the luminance value for the pixel as a value of an adapting luminance, $L_A$, for a region of the image,
wherein the adapting luminance is a local parameter for the region.

11. An apparatus for reproducing color appearance of an image from a source environment at a device at a target environment, comprising:

a light source analyzer configured to analyze pixel values of the image from the source environment to identify a set of candidate light sources, the light source analyzer comprising:

a candidate light source detector configured to detect data representing boundaries for the areas associated with frameworks as the candidate light sources; and a light source identifier configured to identify data representing a subset of the candidate light sources as perceived light sources; and an environmental parameter generator configured to reproduce the color appearance of the image from the source environment at the device at the target environment, the environmental parameter generator comprising:

a degree-of-adaptation generator configured to determine a degree of adaptation, D, for each pixel,
wherein the degree of adaptation, D, indicates whether or to what degree to discount for an illuminant color of a light source, wherein the degree-of-adaptation generator is configured to set the degree of adaptation, D, for pixels associated with a perceived light source to zero for no adaptation, or to any other value lower than is applied to non-light sources; and at least one of the analyzer, detector, identifier, and generators comprise a processing device connected to a memory.

12. The apparatus of claim 11, wherein the color of the pixels is influenced by an illuminant color of at least one of the perceived light sources.

13. The apparatus of claim 11 further comprising:
an image pyramid generator configured to generate data representing downsampled images of the image, and further configured to blur progressively the downsampled images as the number of pixels in the downsampled images decreases, wherein the image and the downsampled images are layers of an image pyramid stored within a data structure.

14. The apparatus of claim 13 further comprising:
a difference evaluator configured to determine differences between layered pixels in two of the image and the downsampled images, wherein a positive, non-zero result associated with at least a subset of the layered pixels is indicative a boundary of at least one of the candidate light sources.

15. The apparatus of claim 13 wherein the candidate light source detector is further configured to determine a difference of Gaussians result image between two of the image and the downsampled images, wherein the difference of Gaussians result image indicates boundaries of the frameworks.

16. The apparatus of claim 11 wherein the light source identifier further comprises:

a size evaluator configured to determine a size of a candidate light source; and a luminance evaluator configured to determine one or more luminance values of the candidate light source, wherein the light source identifier is configured to identify a framework as a perceived light source based on the size being less than a size threshold and the one or more luminance values being above a luminance threshold.

17. An apparatus for reproducing color appearance of an image from a source environment at a device at a target environment, comprising:

a light source analyzer configured to analyze pixel values of the image from the source environment to identify a set of candidate light sources, the light source analyzer comprising:

a candidate light source detector configured to detect data representing boundaries for the areas associated with frameworks as the candidate light sources; and a light source identifier configured to identify data representing a subset of the candidate light sources as perceived light sources; and an environmental parameter generator configured to reproduce the color appearance of the image from the source environment at the device at the target environment, the environmental parameter generator comprising:

a degree-of-adaptation generator configured to determine a degree of adaptation, D, for each pixel, wherein the degree of adaptation, D, indicates whether or to what degree to discount for an illuminant color of a light source, wherein the degree-of-adaptation generator is configured to set the degree of adaptation, D, for pixels associated with a perceived light source to zero for no adaptation, or to any other value lower than is applied to non-light sources; and at least one of the analyzer, detector, identifier, and generators comprise hardware.

* * * * *